US011736178B2

(12) United States Patent
Lee et al.

(10) Patent No.: US 11,736,178 B2
(45) Date of Patent: Aug. 22, 2023

(54) ELECTRONIC DEVICE FOR SELECTING ANTENNA MODULE AND/OR BEAM AND OPERATING METHOD THEREOF

(71) Applicant: SAMSUNG ELECTRONICS CO., LTD., Suwon-si (KR)

(72) Inventors: Jongwon Lee, Suwon-si (KR); Daehee Park, Suwon-si (KR); Chonghwa Seo, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 17/658,059

(22) Filed: Apr. 5, 2022

(65) Prior Publication Data

US 2022/0321196 A1    Oct. 6, 2022

Related U.S. Application Data

(63) Continuation of application No. PCT/KR2022/004554, filed on Mar. 31, 2022.

(30) Foreign Application Priority Data

Apr. 5, 2021  (KR) .................. 10-2021-0044099

(51) Int. Cl.
*H04B 7/02* (2018.01)
*H04B 7/08* (2006.01)
(Continued)

(52) U.S. Cl.
CPC ......... *H04B 7/0834* (2013.01); *H04B 7/0608* (2013.01); *H04B 17/309* (2015.01)

(58) Field of Classification Search
CPC ... H04B 7/0608; H04B 7/0626; H04W 76/16; H04W 74/0858
(Continued)

(56) References Cited

U.S. PATENT DOCUMENTS 8,498,656 B2   7/2013  Mujtaba et al.
10,069,555 B2   9/2018  Islam et al.
(Continued)

FOREIGN PATENT DOCUMENTS

EP     2688141 A1    1/2014
KR  10-1368712 B1    3/2014

OTHER PUBLICATIONS

International Search Report and Written Opinion dated Jul. 26, 2022 in connection with International Patent Application No. PCT/KR2022/004554, 2 pages.
(Continued)

*Primary Examiner* — Zewdu A Kassa

(57) ABSTRACT

A method is performed by an electronic device that includes antenna modules AM1 and AM2. The method includes: while transmitting or receiving through AM1, receiving a specified wireless signal through AM1 and AM2; identifying a first signal quality for the specified wireless signal of AM1 and a second signal quality for the specified wireless signal of AM2; and in response to determining that a difference between the first signal quality and the second signal quality is within a specified signal quality range and that a rank of a wireless channel through which the specified wireless signal is received is two or more, selecting an antenna module to transmit or receive a wireless signal, from among AM1 and AM2, based on first channel information about AM1 and second channel information about AM2. The method includes transmitting or receiving the wireless signal using the selected antenna module.

20 Claims, 16 Drawing Sheets

(51) Int. Cl.
*H04B 7/06* (2006.01)
*H04B 17/309* (2015.01)

(58) Field of Classification Search
USPC ............... 375/267, 261, 259, 219, 295, 316
See application file for complete search history.

(56) References Cited

U.S. PATENT DOCUMENTS

| | | |
|---|---|---|
| 10,237,843 B2 | 3/2019 | Yoshida |
| 10,505,615 B2 | 12/2019 | Islam et al. |
| 10,715,237 B1 * | 7/2020 | Landis ................. H04B 7/0626 |
| 10,715,241 B2 | 7/2020 | Islam et al. |
| 11,075,682 B2 | 7/2021 | Islam et al. |
| 11,184,069 B2 | 11/2021 | Landis et al. |
| 2010/0246725 A1 | 9/2010 | Okuyama et al. |
| 2016/0036508 A1 | 2/2016 | Szini et al. |
| 2018/0062242 A1 | 3/2018 | Szini et al. |
| 2019/0028172 A1 | 1/2019 | Hudson et al. |
| 2021/0068123 A1 | 3/2021 | Zhu et al. |

OTHER PUBLICATIONS

Written Opinion dated Jul. 26, 2022 in connection with International Patent Application No. PCT/KR2022/004554, 5 pages.

* cited by examiner

ELECTRONIC DEVICE FOR SELECTING ANTENNA MODULE AND/OR BEAM AND OPERATING METHOD THEREOF

CROSS-REFERENCE TO RELATED APPLICATIONS

This application is a bypass continuation of International Application No. PCT/KR2022/004554, filed Mar. 31, 2022, which claims priority to Korean Patent Application No. 10-2021-0044099, filed Apr. 5, 2021, the disclosures of which are herein incorporated by reference in their entirety.

BACKGROUND

1. Field

Embodiments of the disclosure relate to an electronic device for selecting an antenna module and/or a beam and an operating method thereof.

2. Description of Related Art

Nowadays, a wireless communication system aims to provide an ultra-high-speed data service of several Gbps by using the broadband with a bandwidth of 100 MHz or more. However, because it is difficult to secure a broadband frequency of 100 MHz or more in a frequency band of hundreds of MHz or several GHz used in a conventional wireless communication system, the way to use a wide frequency band existing in a frequency band of 6 GHz or more is being considered in a recent wireless communication system.

However, because a path-loss of a radio wave is proportional to a frequency band, the path-loss of the radio wave is great at a high frequency. This means that a service coverage is small at the high frequency. To overcome the drawback such as a decrease in a service coverage, the recent wireless communication system uses a beamforming technology for generating a directional beam by using a plurality of antennas such that a propagation range of the radio wave increases. Also, to overcome the decrease in the service coverage, the recent wireless communication system uses a plurality of antenna modules such that different physical regions are covered.

SUMMARY

In a recent wireless communication system, a communication speed may be maximized when directional directions of a transmission beam of a transmission device and a reception beam of a reception device are synchronized with each other. For this reason, a technology for selecting an optimal antenna module and an optimal beam may be important. In addition, a technology for quickly selecting the optimal antenna module and the optimal beam may be important for low latency (or delay) of the recent wireless communication system.

However, in the case where a computational amount consumed to select the optimal antenna module and/or the optimal beam for the communication speed and the low latency increases, battery consumption of an electronic device may increase.

An electronic device according to various embodiments of the disclosure is directed to provide an antenna module for a stable communication speed and/or low latency.

According to an embodiment, an electronic device may include a first antenna module that includes one or more antennas, a second antenna module that is spaced from the first antenna module and includes one or more antennas, a processor, and a memory that stores instructions. While transmitting and/or receiving a wireless signal through the first antenna module, the instructions, when executed by the processor, may cause the processor to receive a specified wireless signal through the first antenna module and the second antenna module, to identify a first signal quality for the specified wireless signal of the first antenna module and a second signal quality for the specified wireless signal of the second antenna module, to verify whether a difference between the first signal quality and the second signal quality is within a specified signal quality range, to determine an antenna module, which is to transmit and/or receive a wireless signal, from among the first antenna module and the second antenna module, based on first channel information about the first antenna module and second channel information about the second antenna module, when the difference between the first signal quality and the second signal quality is within the specified signal quality range and when a rank of a wireless channel through which the specified wireless signal is received is 2 or more, and to transmit and/or receive a wireless signal by using the determined antenna module.

According to an embodiment, an operating method of an electronic device may include, while transmitting and/or receiving a wireless signal through a first antenna module of the electronic device, receiving a specified wireless signal through the first antenna module and a second antenna module of the electronic device, identifying a first signal quality for the specified wireless signal of the first antenna module and a second signal quality for the specified wireless signal of the second antenna module, verifying whether a difference between the first signal quality and the second signal quality is within a specified signal quality range, determining an antenna module, which is to transmit and/or receive a wireless signal, from among the first antenna module and the second antenna module, based on first channel information about the first antenna module and second channel information about the second antenna module, when the difference between the first signal quality and the second signal quality is within the specified signal quality range and when a rank of a wireless channel through which the specified wireless signal is received is 2 or more, and transmitting and/or receiving a wireless signal by using the determined antenna module.

The effects that are achieved through various embodiments of the present disclosure may not be limited to what has been described herein, and other effects not described herein may be clearly understood from the following detailed description by persons skilled in the art.

According to various embodiments of the disclosure, an optimum antenna module and an optimum beam may be quickly selected in consideration of the trade-off between the communication speed and the computing load.

The effects that are achieved through various embodiments of the present disclosure may not be limited to what has been described herein, and other effects not described herein may be clearly understood from the following detailed description by persons skilled in the art.

With regard to description of drawings, the same or similar components will be marked by the same or similar reference signs.

DETAILED DESCRIPTION

Figure 1:
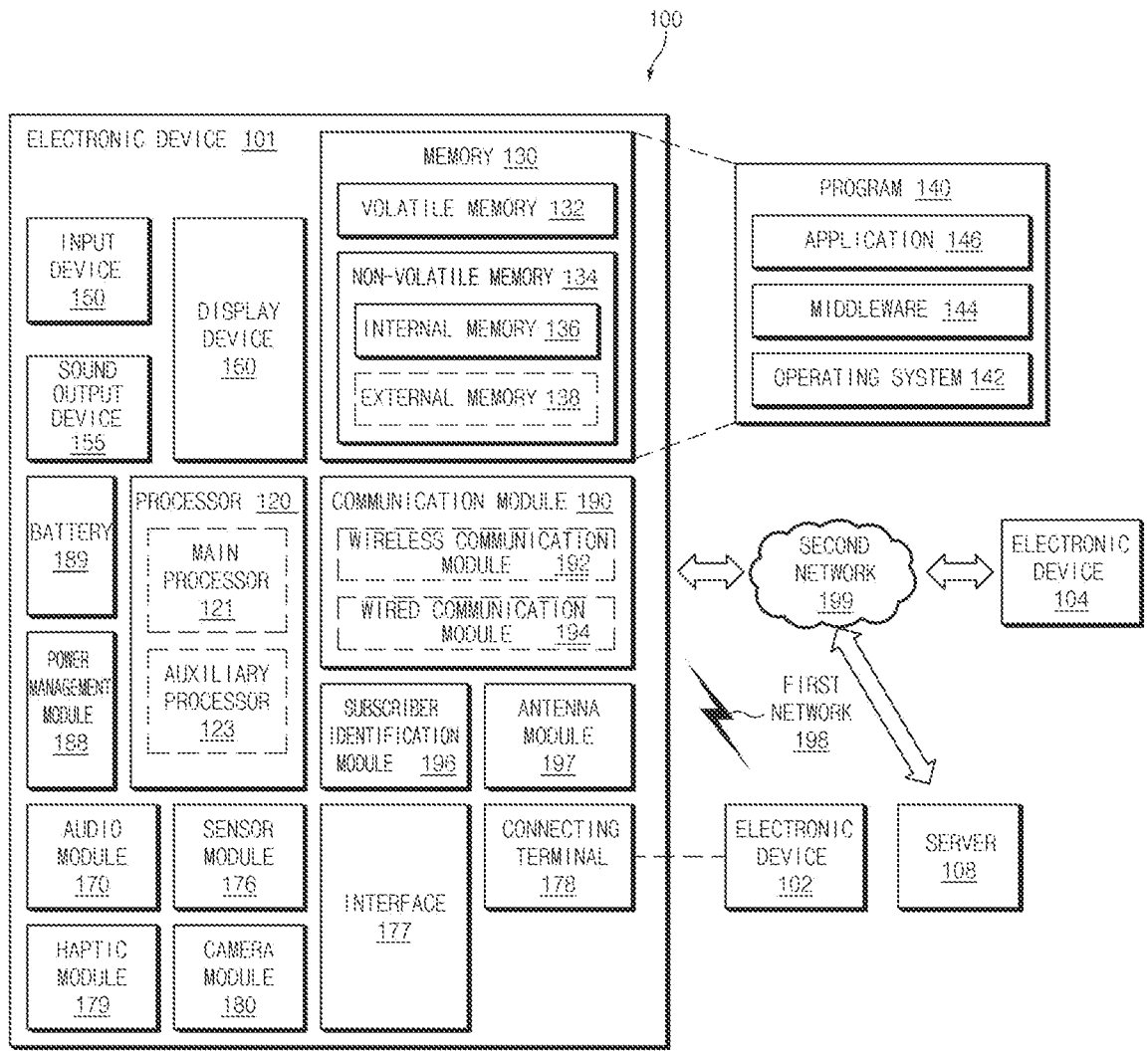
FIG. 1 is a block diagram of an electronic device in a network environment according to various embodiments.

FIG. 1 is a block diagram illustrating an electronic device 101 in a network environment 100 according to various embodiments. Referring to FIG. 1, the electronic device 101 in the network environment 100 may communicate with an electronic device 102 via a first network 198 (e.g., a short-range wireless communication network), or at least one of an electronic device 104 or a server 108 via a second network 199 (e.g., a long-range wireless communication network). According to an embodiment, the electronic device 101 may communicate with the electronic device 104 via the server 108. According to an embodiment, the electronic device 101 may include a processor 120, memory 130, an input module 150, a sound output module 155, a display module 160, an audio module 170, a sensor module 176, an interface 177, a connecting terminal 178, a haptic module 179, a camera module 180, a power management module 188, a battery 189, a communication module 190, a subscriber identification module (SIM) 196, or an antenna module 197. In some embodiments, at least one of the components (e.g., the connecting terminal 178) may be omitted from the electronic device 101, or one or more other components may be added in the electronic device 101. In some embodiments, some of the components (e.g., the sensor module 176, the camera module 180, or the antenna module 197) may be implemented as a single component (e.g., the display module 160).

The processor 120 may execute, for example, software (e.g., a program 140) to control at least one other component (e.g., a hardware or software component) of the electronic device 101 coupled with the processor 120, and may perform various data processing or computation. According to one embodiment, as at least part of the data processing or computation, the processor 120 may store a command or data received from another component (e.g., the sensor module 176 or the communication module 190) in volatile memory 132, process the command or the data stored in the volatile memory 132, and store resulting data in non-volatile memory 134. According to an embodiment, the processor 120 may include a main processor 121 (e.g., a central processing unit (CPU) or an application processor (AP)), or an auxiliary processor 123 (e.g., a graphics processing unit (GPU), a neural processing unit (NPU), an image signal processor (ISP), a sensor hub processor, or a communication processor (CP)) that is operable independently from, or in conjunction with, the main processor 121. For example, when the electronic device 101 includes the main processor 121 and the auxiliary processor 123, the auxiliary processor 123 may be adapted to consume less power than the main processor 121, or to be specific to a specified function. The auxiliary processor 123 may be implemented as separate from, or as part of the main processor 121.

The auxiliary processor 123 may control at least some of functions or states related to at least one component (e.g., the display module 160, the sensor module 176, or the communication module 190) among the components of the electronic device 101, instead of the main processor 121 while the main processor 121 is in an inactive (e.g., sleep) state, or together with the main processor 121 while the main processor 121 is in an active state (e.g., executing an application). According to an embodiment, the auxiliary processor 123 (e.g., an image signal processor or a communication processor) may be implemented as part of another component (e.g., the camera module 180 or the communication module 190) functionally related to the auxiliary processor 123. According to an embodiment, the auxiliary processor 123 (e.g., the neural processing unit) may include a hardware structure specified for artificial intelligence model processing. An artificial intelligence model may be generated by machine learning. Such learning may be performed, e.g., by the electronic device 101 where the artificial intelligence is performed or via a separate server (e.g., the server 108). Learning algorithms may include, but are not limited to, e.g., supervised learning, unsupervised learning, semi-supervised learning, or reinforcement learning. The artificial intelligence model may include a plurality of artificial neural network layers. The artificial neural network may be a deep neural network (DNN), a convolutional neural network (CNN), a recurrent neural network (RNN), a restricted Boltzmann machine (RBM), a deep belief network (DBN), a bidirectional recurrent deep neural network (BRDNN), deep Q-network or a combination of two or more thereof but is not limited thereto. The artificial intelligence model may, additionally or alternatively, include a software structure other than the hardware structure.

The memory 130 may store various data used by at least one component (e.g., the processor 120 or the sensor module 176) of the electronic device 101. The various data may include, for example, software (e.g., the program 140) and input data or output data for a command related thereto. The memory 130 may include the volatile memory 132 or the non-volatile memory 134.

The program 140 may be stored in the memory 130 as software, and may include, for example, an operating system (OS) 142, middleware 144, or an application 146.

The input module 150 may receive a command or data to be used by another component (e.g., the processor 120) of the electronic device 101, from the outside (e.g., a user) of the electronic device 101. The input module 150 may include, for example, a microphone, a mouse, a keyboard, a key (e.g., a button), or a digital pen (e.g., a stylus pen).

The sound output module 155 may output sound signals to the outside of the electronic device 101. The sound output module 155 may include, for example, a speaker or a receiver. The speaker may be used for general purposes, such as playing multimedia or playing record. The receiver may be used for receiving incoming calls. According to an embodiment, the receiver may be implemented as separate from, or as part of the speaker.

The display module 160 may visually provide information to the outside (e.g., a user) of the electronic device 101. The display module 160 may include, for example, a display, a hologram device, or a projector and control circuitry to control a corresponding one of the display, hologram device, and projector. According to an embodiment, the display module 160 may include a touch sensor adapted to detect a touch, or a pressure sensor adapted to measure the intensity of force incurred by the touch.

The audio module 170 may convert a sound into an electrical signal and vice versa. According to an embodiment, the audio module 170 may obtain the sound via the input module 150, or output the sound via the sound output module 155 or a headphone of an external electronic device (e.g., an electronic device 102) directly (e.g., wiredly) or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly (e.g., wiredly) or wirelessly. According to an embodiment, the interface 177 may include, for example, a high definition multimedia interface (HDMI), a universal serial bus (USB) interface, a secure digital (SD) card interface, or an audio interface.

A connecting terminal 178 may include a connector via which the electronic device 101 may be physically connected with the external electronic device (e.g., the electronic device 102). According to an embodiment, the connecting terminal 178 may include, for example, a HDMI connector, a USB connector, a SD card connector, or an audio connector (e.g., a headphone connector).

The haptic module 179 may convert an electrical signal into a mechanical stimulus (e.g., a vibration or a movement) or electrical stimulus which may be recognized by a user via his tactile sensation or kinesthetic sensation. According to an embodiment, the haptic module 179 may include, for example, a motor, a piezoelectric element, or an electric stimulator.

The camera module 180 may capture a still image or moving images. According to an embodiment, the camera module 180 may include one or more lenses, image sensors, image signal processors, or flashes.

The power management module 188 may manage power supplied to the electronic device 101. According to one embodiment, the power management module 188 may be implemented as at least part of, for example, a power management integrated circuit (PMIC).

The battery 189 may supply power to at least one component of the electronic device 101. According to an embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently from the processor 120 (e.g., the application processor (AP)) and supports a direct (e.g., wired) communication or a wireless communication. According to an embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device via the first network 198 (e.g., a short-range communication network, such as Bluetooth™, wireless-fidelity (Wi-Fi) direct, or infrared data association (IrDA)) or the second network 199 (e.g., a long-range communication network, such as a legacy cellular network, a 5G network, a next-generation communication network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 192 may identify and authenticate the electronic device 101 in a communication network, such as the first network 198 or the second network 199, using subscriber information (e.g., international mobile subscriber identity (IMSI)) stored in the subscriber identification module 196.

The wireless communication module 192 may support a 5G network, after a 4G network, and next-generation communication technology, e.g., new radio (NR) access technology. The NR access technology may support enhanced mobile broadband (eMBB), massive machine type communications (mMTC), or ultra-reliable and low-latency communications (URLLC). The wireless communication module 192 may support a high-frequency band (e.g., the mmWave band) to achieve, e.g., a high data transmission rate. The wireless communication module 192 may support various technologies for securing performance on a high-frequency band, such as, e.g., beamforming, massive multiple-input and multiple-output (massive MIMO), full dimensional MIMO (FD-MIMO), array antenna, analog beam-forming, or large scale antenna. The wireless communication module 192 may support various requirements specified in the electronic device 101, an external electronic device (e.g., the electronic device 104), or a network system (e.g., the second network 199). According to an embodiment, the wireless communication module 192 may support a peak data rate (e.g., 20 Gbps or more) for implementing eMBB, loss coverage (e.g., 164 dB or less) for implementing mMTC, or U-plane latency (e.g., 0.5 ms or less for each of downlink (DL) and uplink (UL), or a round trip of 1 ms or less) for implementing URLLC.

The antenna module 197 may transmit or receive a signal or power to or from the outside (e.g., the external electronic device) of the electronic device 101. According to an embodiment, the antenna module 197 may include an antenna including a radiating element composed of a conductive material or a conductive pattern formed in or on a substrate (e.g., a printed circuit board (PCB)). According to an embodiment, the antenna module 197 may include a plurality of antennas (e.g., array antennas). In such a case, at least one antenna appropriate for a communication scheme used in the communication network, such as the first network 198 or the second network 199, may be selected, for example, by the communication module 190 (e.g., the wireless communication module 192) from the plurality of antennas. The signal or the power may then be transmitted or received between the communication module 190 and the external electronic device via the selected at least one antenna. According to an embodiment, another component (e.g., a radio frequency integrated circuit (RFIC)) other than the radiating element may be additionally formed as part of the antenna module 197.

According to various embodiments, the antenna module 197 may form a mmWave antenna module. According to an embodiment, the mmWave antenna module may include a printed circuit board, a RFIC disposed on a first surface (e.g., the bottom surface) of the printed circuit board, or adjacent to the first surface and capable of supporting a designated high-frequency band (e.g., the mmWave band), and a plurality of antennas (e.g., array antennas) disposed on a second surface (e.g., the top or a side surface) of the printed circuit board, or adjacent to the second surface and capable of transmitting or receiving signals of the designated high-frequency band.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 101 and the external electronic device 104 via the server 108 coupled with the second network 199. Each of the electronic devices 102 or 104 may be a device of a same type as, or a different type, from the electronic device 101. According to an embodiment, all or some of operations to be executed at the electronic device 101 may be executed at one or more of the external electronic devices 102, 104, or 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, mobile edge computing (MEC), or client-server computing technology may be used, for example. The electronic device 101 may provide ultra low-latency services using, e.g., distributed computing or mobile edge computing. In another embodiment, the external electronic device 104 may include an internet-of-things (IoT) device. The server 108 may be an intelligent server using machine learning and/or a neural network. According to an embodiment, the external electronic device 104 or the server 108 may be included in the second network 199. The electronic device 101 may be applied to intelligent services (e.g., smart home, smart city, smart car, or healthcare) based on 5G communication technology or IoT-related technology.

Figure 2:
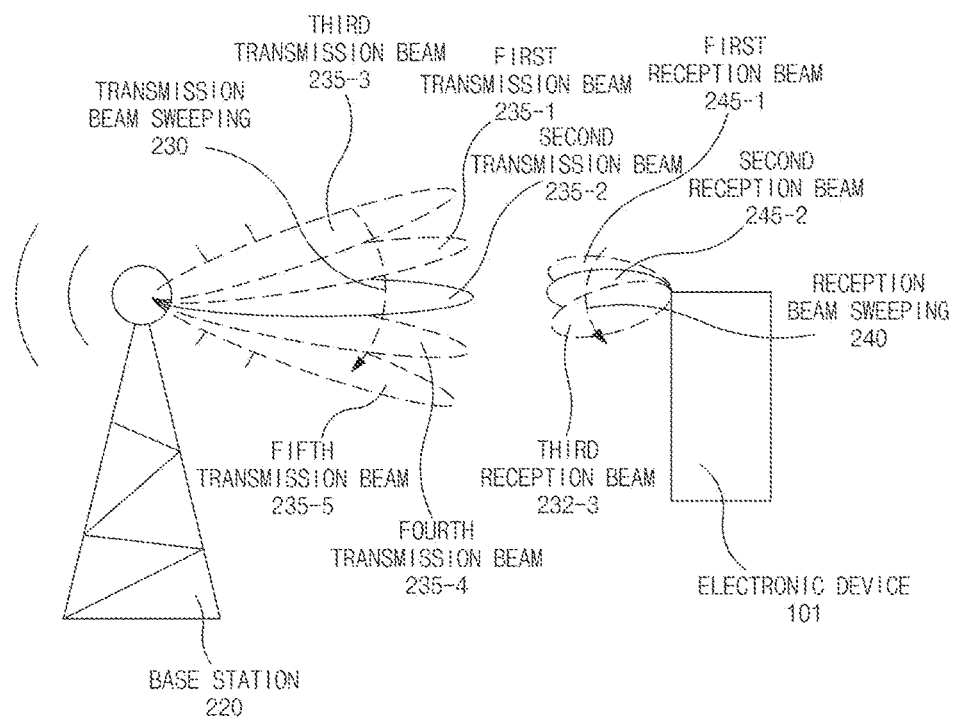
FIG. 2 illustrates an embodiment of an operation for a wireless communication connection between a base station and an electronic device, in a second network using a directional beam for a wireless connection.

FIG. 2 illustrates an embodiment of an operation for a wireless communication connection between a base station 220 and the electronic device 101, in a second network using a directional beam for a wireless connection, for example, a 5G network. First, for the wireless communication connection, the base station (e.g., a gNodeB (gNB) or a transmission reception point (TRP)) 220 may perform a beam detection operation with the electronic device 101. In the illustrated embodiment, for the beam detection, the base station 220 may perform transmission beam sweeping 230 by sequentially transmitting a plurality of transmission beams, for example, first to fifth transmission beams 231-1 to 231-5 whose directions are different from each other.

The first to fifth transmission beams 231-1 to 231-5 may include at least one synchronization sequences (SS)/physical broadcast channel (PBCH) (SS/PBCH) block. The SS/PBCH block may be used to measure a channel of the electronic device 101 or a beam strength periodically.

As another example, the first to fifth transmission beams 231-1 to 231-5 may include at least one channel state information-reference signal (CSI-RS). The CSI-RS that is a reference signal capable of being flexibly set by the base station 220 may be transmitted periodically/semi-persistently or aperiodically. The electronic device 101 may measure a channel and the intensity of a beam by using the CSI-RS.

The transmission beams may form a radiation pattern having a selected beam width. For example, the transmission beams may have a broad radiation pattern with a first beam width, or a sharp radiation pattern with a second beam width smaller than the first beam width. For example, a transmission beam including the SS/PBCH block may have a broader radiation pattern than a transmission beam including the CSI-RS.

While the base station 220 performs the transmission beam sweeping 230, the electronic device 101 may perform reception beam sweeping 240. For example, while the base station 220 performs the first transmission beam sweeping 230, the electronic device 101 may fix a first reception beam 245-1 to a first direction and may receive a SS/PBCH block signal transmitted through at least one of the first to fifth transmission beams 231-1 to 231-5. While the base station 220 performs the second transmission beam sweeping 230, the electronic device 101 may fix a second reception beam 245-2 to a second direction and may receive SS/PBCH block signals transmitted through the first to fifth transmission beams 231-1 to 231-5. As such, the electronic device 101 may select a reception beam (e.g., the second reception beam 245-2) and a transmission beam (e.g., the third transmission beam 231-3), which are able to be communicated, based on a result of receiving signals through the reception beam sweeping 240.

After the communicable transmission and reception beams are selected, the base station 220 and the electronic device 101 may transmit and/or receive basic information for cell setting and may set additional information for abeam operation based on the basic information. For example, the beam operation information may include detailed information about a set beam, a SS/PBCH block, a CSI-RS, or setting information about an additional reference signal.

Also, the electronic device 101 may continuously monitor a channel and the intensity of a beam by using at least one of the SS/PBCH block and the CSI-RS included in a transmission beam. The electronic device 101 may adaptively select a beam of a good beam quality by using the monitoring operation. Selectively, when the communication connection is released due to the movement of the electronic device 101 or the interruption of beam, a communicable beam may be determined by again performing the above beam sweeping operation.

Figure 3:
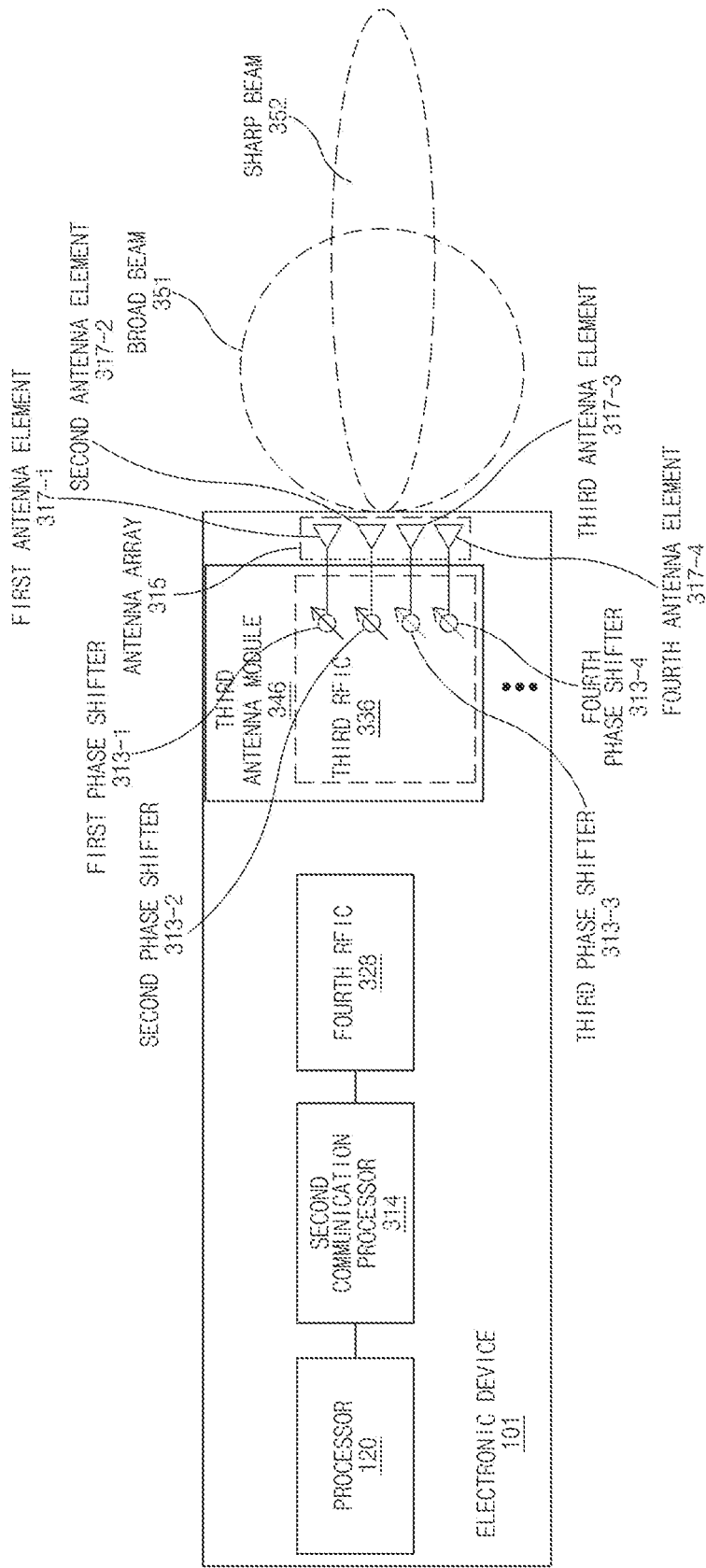
FIG. 3 is a block diagram of an electronic device for 5G network communication, according to an embodiment.

FIG. 3 is a block diagram of the electronic device 101 for 5G network communication, according to an embodiment. The electronic device 101 may include various components illustrated in FIG. 3. However, in FIG. 3, for a brief description, the electronic device 101 is illustrated as including the processor 120, a second communication processor 314, a fourth RFIC 328, and at least one third antenna module 346.

In the illustrated embodiment, the third antenna module 346 may include first to fourth phase shifters 313-1 to 313-4 and/or first to fourth antenna elements 317-1 to 317-4. Each one of the first to fourth antenna elements 317-1 to 317-4 may be electrically connected with one of the first to fourth phase shifters 313-1 to 313-4 independently of each other. The first to fourth antenna elements 317-1 to 317-4 may form at least one antenna array 315.

The second communication processor 314 may control phases of signals to be transmitted and/or received through the first to fourth antenna elements 317-1 to 317-4 by controlling the first to fourth phase shifters 313-1 to 313-4 and thus may generate a transmission beam and/or a reception beam in a selected direction.

According to an embodiment, the third antenna module 346 may form a beam 351 (hereinafter referred to as "broad beam") of the broad radiation pattern or a beam 352 (hereinafter referred to as "sharp beam") of the sharp radiation pattern, which is described above, depending on the number of antenna elements used. For example, when the third antenna module 346 uses all of the first to fourth antenna elements 317-1 to 317-4, the third antenna module 346 may form the sharp beam 352; when the third antenna module 346 uses only the first antenna element 317-1 and the second antenna element 317-2, the third antenna module 346 may form the broad beam 351. The broad beam 351 may provide a wider coverage than the sharp beam 352 but may have a low antenna gain. Accordingly, the broad beam 351 may be more effective upon searching for a beam. In contrast, the sharp beam 352 may provide a narrower coverage than the broad beam 351 but may have a high antenna gain. Accordingly, the sharp beam 352 may make communication performance better.

According to an embodiment, the second communication processor 314 may utilize the sensor module 176 (e.g., a 9-axis sensor, a grip sensor, or a GPS) for beam search. For example, the electronic device 101 may adjust a beam search location and/or a beam search period based on a location and/or a movement of the electronic device 101 detected by using the sensor module 176. As another example, when the electronic device 101 is gripped by a user, the electronic device 101 may select an antenna module having better communication performance from among a plurality of third antenna modules 346 by detecting a user-gripped portion of the electronic device 101 by using a grip sensor.

Figure 4A:
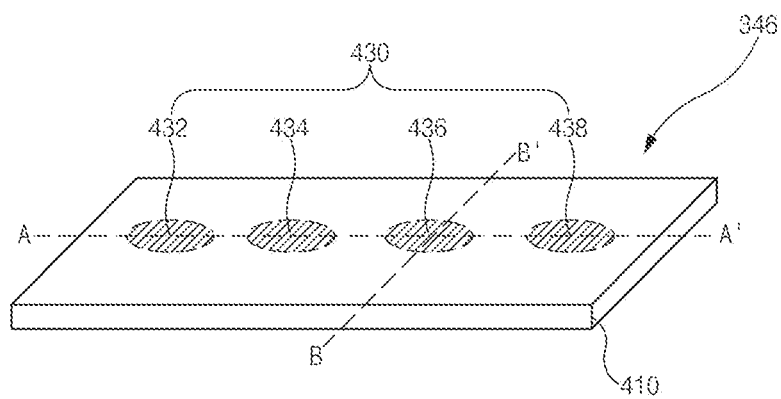
FIG. 4a illustrates an embodiment of a structure of a third antenna module.
Figure 4B:
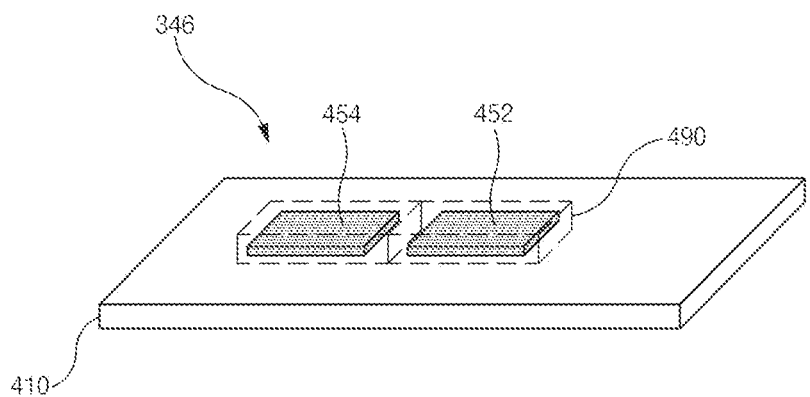
FIG. 4b illustrates an embodiment of a structure of a third antenna module.
Figure 4C:
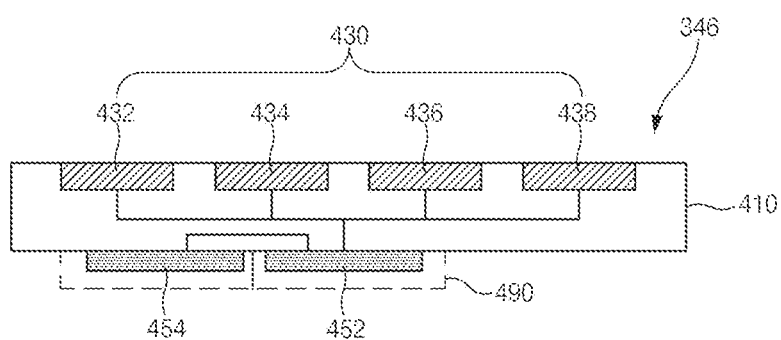
FIG. 4c illustrates an embodiment of a structure of a third antenna module.

FIGS. 4A, 4B, and 4C illustrate an embodiment of a structure of the third antenna module 346 described with reference to FIG. 3, for example. FIG. 4A is a perspective view of the third antenna module 346 when viewed from one side, and FIG. 4B is a perspective view of the third antenna module 346 when viewed from another side. FIG. 4C is a cross-sectional view of the third antenna module 346 taken along line A-A' of FIG. 4A.

Referring to FIGS. 4A to 4C, in an embodiment, the third antenna module 346 may include a printed circuit board 410, an antenna array 430, a radio frequency integrated circuit (RFIC) 452, a power manage integrated circuit (PMIC) 454, and a module interface. Selectively, the third antenna module 346 may further include a shielding member 490. In various embodiments, at least one of the above components may be omitted, or at least two of the components may be integrally formed.

The printed circuit board 410 may include a plurality of conductive layers and a plurality of non-conductive layers, and the conductive layers and the non-conductive layers may be alternately stacked. The printed circuit board 410 may provide the electrical connection between various electronic components disposed on the printed circuit board 410 and/or the outside by using lines (or wires) and conductive vias formed in the conductive layers.

The antenna array 430 (e.g., 315 of FIG. 3) may include a plurality of antenna elements 432, 434, 436, and 438 disposed to form a directional beam. The antenna elements 432, 434, 436, and 438 may be formed on a first surface of the printed circuit board 410 as illustrated. According to another embodiment, the antenna array 430 may be formed within the printed circuit board 410. According to embodiments, the antenna array 430 may include a plurality of antenna arrays (e.g., a dipole antenna array and/or a patch antenna array) that are identical or different in shape or kind.

The RFIC 452 (e.g., 336 of FIG. 3) may be disposed in another region (e.g., on a second surface facing away from the first surface) of the printed circuit board 410, which is spaced from the antenna array 430. The RFIC 452 is configured to process a signal in a selected frequency band, which is transmitted/received through the antenna array 430. According to an embodiment, in the case of transmitting a signal, the RFIC 452 may convert a baseband signal obtained from a communication processor (not illustrated) into an RF signal in a specified band. In the case of receiving a signal, the RFIC 452 may convert an RF signal received through the antenna array 430 into a baseband signal and may provide the baseband signal to the communication processor.

According to another embodiment, in the case of transmitting a signal, the RFIC 452 may up-convert an IF signal (e.g., about 9 GHz to about 11 GHz) obtained from an intermediate frequency integrated circuit (IFIC) (e.g., 328 of FIG. 3) into an RF signal. In the case of receiving a signal, the RFIC 452 may down-convert an RF signal obtained through the antenna array 430 into an IF signal and may provide the IF signal to the IFIC.

The PMIC 454 may be disposed in another region (e.g., on the second surface) of the printed circuit board 410, which is spaced from the antenna array 430. The PMIC 454 may be supplied with a voltage from a main PCB (not illustrated) and may provide a power sufficient for various components (e.g., the RFIC 452) over the antenna module.

The shielding member 490 may be disposed at a portion (e.g., on the second surface) of the printed circuit board 410 such that at least one of the RFIC 452 or the PMIC 454 is electromagnetically shielded. According to an embodiment, the shielding member 490 may include a shield can.

Although not illustrated, in various embodiments, the third antenna module 346 may be electrically connected with another printed circuit board (e.g., a main circuit board) through the module interface. The module interface may include a connection member, for example, a coaxial cable connector, a board to board connector, an interposer, or a flexible printed circuit board (FPCB). The RFIC 452 and/or the PMIC 454 of the antenna module 346 may be electrically connected with the printed circuit board 410 through the connection member.

Figure 5:
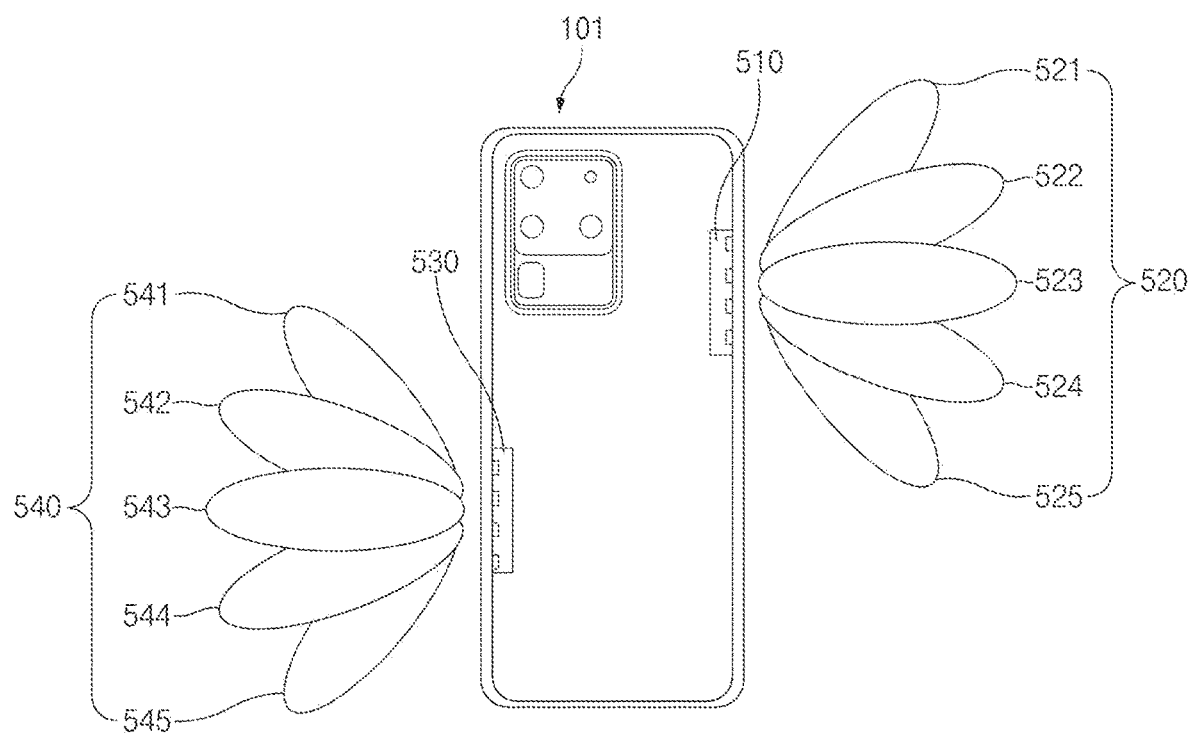
FIG. 5 is a diagram illustrating an electronic device according to an embodiment.
Figure 6:
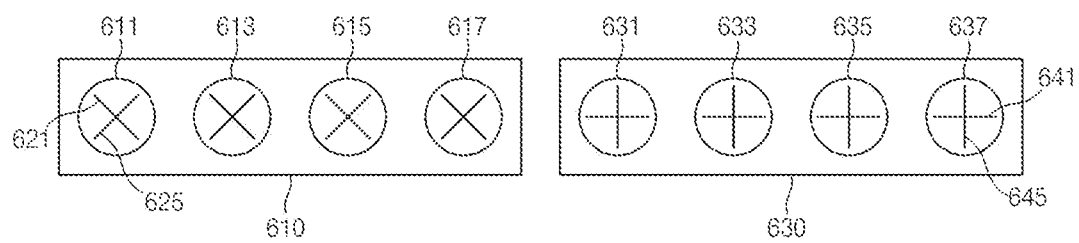
FIG. 6 is a diagram illustrating an antenna module according to an embodiment.
Figure 7:
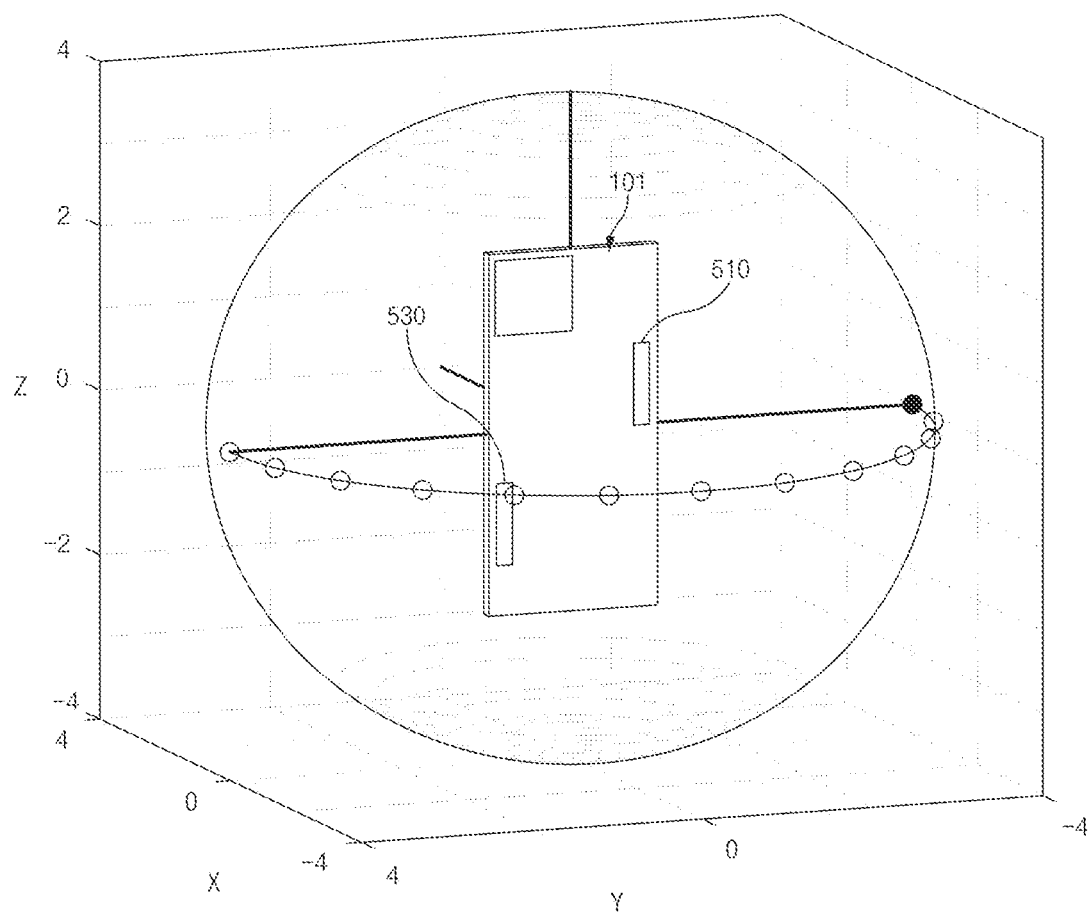
FIG. 7 is a diagram illustrating how an electronic device according to an embodiment receives wireless signals transmitted from different signal transmission locations.
Figure 8A:
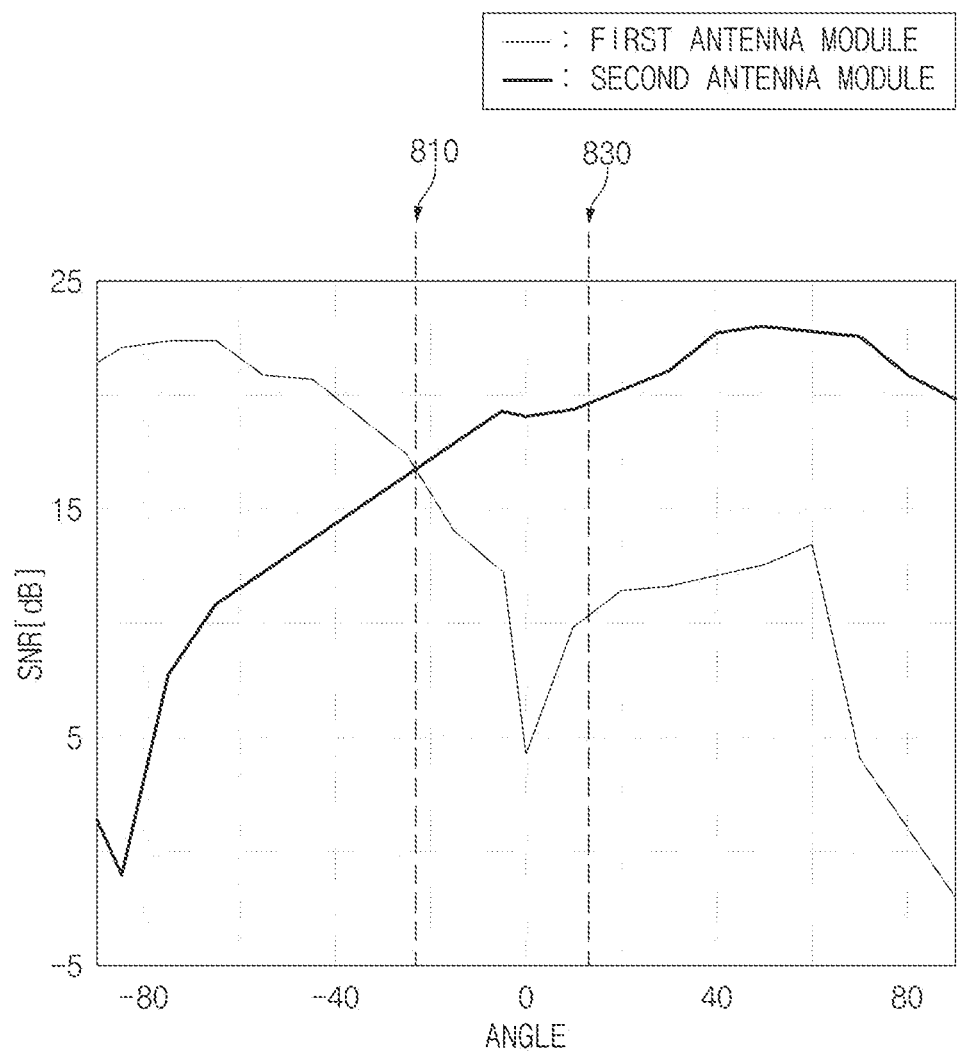
FIG. 8A is a graph illustrating a signal to noise ratio (SNR) of a wireless signal that an electronic device according to an embodiment receives.
Figure 8B:
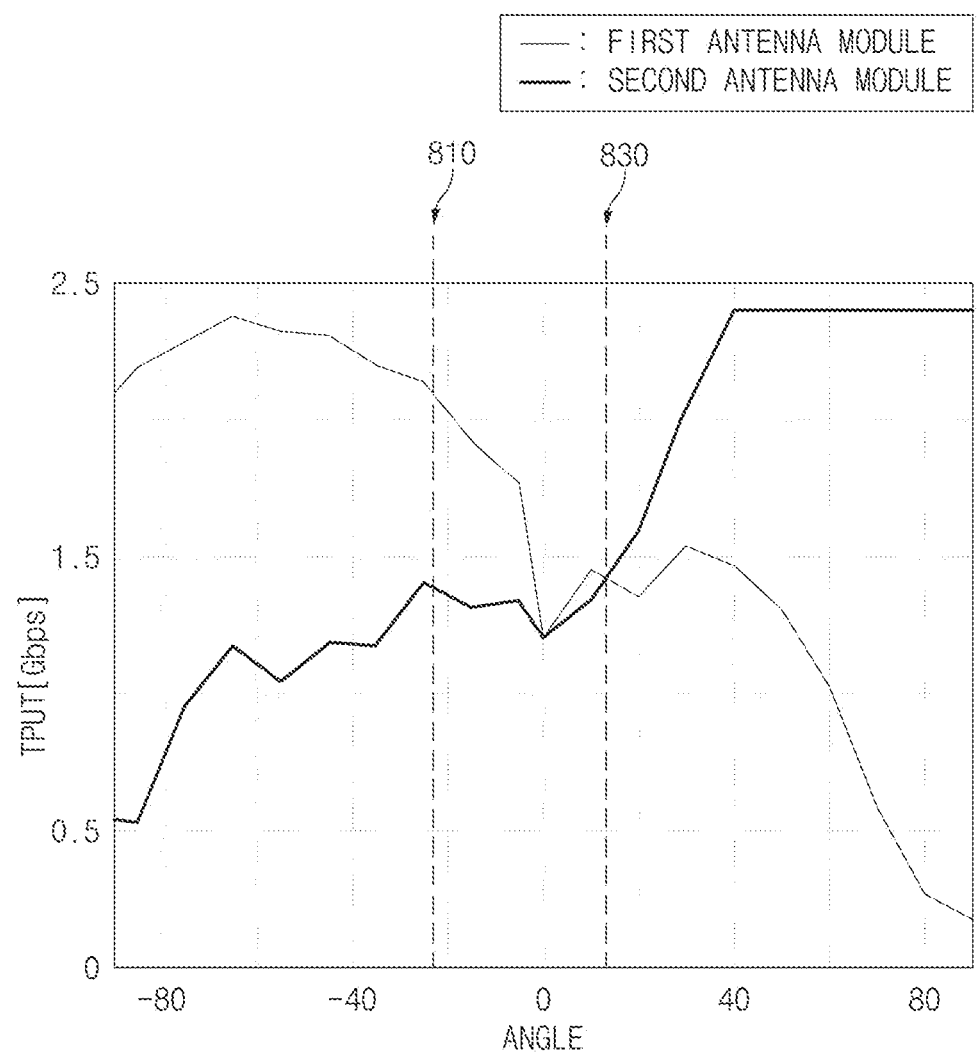
FIG. 8B is a graph illustrating a throughput identified based on a wireless signal that an electronic device according to an embodiment receives.

FIG. 5 is a diagram illustrating an electronic device according to an embodiment. FIG. 6 is a diagram illustrating an antenna module according to an embodiment. FIG. 7 is a diagram illustrating how an electronic device according to an embodiment receives wireless signals transmitted from different signal transmission locations. FIG. 8A is a graph illustrating a signal to noise ratio (SNR) of a wireless signal that an electronic device according to an embodiment receives. FIG. 8B is a graph illustrating a throughput identified based on a wireless signal that an electronic device according to an embodiment receives. Below, FIGS. 5, 6, 7, 8A, and 8B will be described with reference to the components of FIGS. 1 to 4C.

Referring to FIG. 5, the electronic device 101 may include at least two antenna modules 510 and 530. In an embodiment, each of the at least two antenna modules 510 and 530 may correspond to the antenna module 197 of FIG. 1. In an embodiment, each of the at least two antenna modules 510 and 530 may correspond to the third antenna module 346 of FIG. 3 and/or FIGS. 4A to 4C.

In an embodiment, the at least two antenna modules 510 and 530 may be provided in the electronic device 101 so as to be physically spaced from each other. For example, the first antenna module 510 may be provided on a first side surface of the electronic device 101, and the second antenna module 530 may be provided on a second side surface of the electronic device 101. In an embodiment, the first side surface and the second side surface may be different side surfaces of the electronic device 101.

In an embodiment, each of the at least two antenna modules 510 and 530 may include at least one antenna. In an embodiment, the at least two antenna modules 510 and 530 may form a plurality of beam patterns 520 and 540 by using the at least one antenna. In an embodiment, a plurality of beam patterns 521, 522, 523, 524, and 525 (e.g., the first to third reception beams 245-1 to 245-3) formed through the first antenna module 510 may be formed to face different directions. In an embodiment, a plurality of beam patterns 541, 542, 543, 544, and 525 formed through the second antenna module 530 may be formed to face different directions. In an embodiment, each of the at least two antenna modules 510 and 530 may include a plurality of patch antennas and/or a plurality of dipole antennas. In an embodiment, each of the at least two antenna modules 510 and 530 may include a plurality of patch antennas.

In an embodiment, the antennas of at least one from among the at least two antenna modules 510 and 530 may be arranged in a given shape. For example, at least one antenna may be arranged in the shape of a line, a plane (e.g., a circle, a rectangle, or a polygon), a non-plane (e.g., a curve), or a combination thereof.

In an embodiment, at least one antenna may be disposed to face a direction different from that of at least another antenna. For example, a first antenna of the at least one antenna may face a first direction, and a second antenna of the at least one antenna may face a second direction. For example, the first direction and the second direction may not be parallel to each other. For example, the first direction and the second direction may cross at right angles. In an embodiment, the at least two antenna modules 510 and 530 may include a plurality of multi-polarized antennas (e.g., dual-polarized antennas). For example, the dual-polarized antennas may include two antennas (e.g., a first antenna 621 and a second antenna 625 of FIG. 6) for the purpose of providing two different polarization characteristics.

Referring to FIG. 6, each of at least two antenna modules 510 and 530 may be formed of a first antenna pattern 610 and/or a second antenna pattern 630. In an embodiment, each of the at least two antenna modules 510 and 530 may correspond to the third antenna module 346 of FIG. 3 and/or FIGS. 4A to 4C. In an embodiment, antenna elements 611, 613, 615, and/or 617 may respectively correspond to the antenna elements 432, 434, 436, and 438 of the third antenna module 346 of FIGS. 4A to 4C. In an embodiment, antenna elements 631, 633, 635, and/or 637 may respectively correspond to the antenna elements 432, 434, 436, and 438 of the third antenna module 346 of FIGS. 4A to 4C.

In an embodiment, referring to the first antenna pattern 610, a plurality of (e.g., 4) antenna elements 611, 613, 615, and/or 617 may be provided in the at least two antenna modules 510 and 530. Each of the plurality of antenna elements 611, 613, 615, and/or 617 may include two antennas 621 and 625. The first antenna 621 of the two antennas 621 and 625 may be steered to −45 degrees, and the second antenna 625 of the two antennas 621 and 625 may be steered to +45 degrees. In an embodiment, each of the plurality of antenna elements 611, 613, 615, and/or 617 may include a plurality of feeding parts. In an embodiment, each of the plurality of feeding parts may be used to transmit/receive different polarized signals. In an embodiment, each of the plurality of antenna elements 611, 613, 615, and/or 617 may include two feeding parts. In an embodiment, the electronic device 101 may perform wireless communication by using different polarizations. In this case, when the electronic device 101 performs wireless communication by using at least two different polarizations at the same time, the electronic device 101 may be evaluated as performing wireless communication of RANK 2. Also, when the electronic device 101 performs wireless communication by using one polarization, the electronic device 101 may be evaluated as performing wireless communication of RANK 1. In an embodiment, in the case of using a plurality of different polarizations, beams that are respectively formed depending on the plurality of different polarizations may be oriented to the same direction.

In an embodiment, referring to the second antenna pattern 630, a plurality of (e.g., 4) antenna elements 631, 633, 635, and/or 637 may be provided in the at least two antenna modules 510 and 530. Each of the plurality of antenna elements 631, 633, 635, and/or 637 may include two antennas 641 and 645. The first antenna 641 of the two antennas 641 and 645 may be polarized in a horizontal direction (H-Pol: horizontal polarization), and the second antenna 645 of the two antennas 641 and 645 may be polarized in a vertical direction (V-Pol: vertical polarization). In an embodiment, each of the plurality of antenna elements 631, 633, 635, and/or 637 may include a plurality of feeding parts. In an embodiment, each of the plurality of antenna elements 631, 633, 635, and/or 637 may include two feeding parts.

The at least two antenna modules 610 and 630 are illustrated in FIG. 6 as including antennas of a line shape, and this is only as an example. For example, the at least two antenna modules 610 and 630 may include antennas arranged in the shape of a line, a plane (e.g., a circle, a rectangle, or a polygon), a non-plane (e.g., a curve), or a combination thereof.

The at least two antenna modules 610 and 630 are illustrated in FIG. 6 as including antennas steered to two directions, and this is only as an example. In an embodiment, the at least two antenna modules 610 and 630 may include antennas steered to three or more directions.

In an embodiment, because the at least two antenna modules 510 and 530 are physically spaced from each other, the at least two antenna modules 510 and 530 may have different characteristics. In an embodiment, because the at least two antenna modules 510 and 530 are disposed to face different directions, the at least two antenna modules 510 and 530 may have different characteristics. For example, the at least two antenna modules 510 and 530 may differently identify an SNR and/or an expected transmission speed with respect to a signal propagated from the same location.

Referring to FIG. 7, the at least two antenna modules 510 and 530 may differently identify an SNR and/or an expected transmission speed with respect to a signal transmitted along an X-Y plane at a point spaced from the center of the electronic device 101 as much as a given distance.

Referring to FIG. 8A, it is confirmed that the SNR identified through the first antenna module 510 tends to increase as a signal transmission location changes from −90 degrees (i.e., a location where X=0 and Y=4, in an X-Y plane where Z=0 (refer to FIG. 4)) to 90 degrees (i.e., a location where X=0 and Y=−4, in the X-Y plane where Z=0 (refer to FIG. 4)). Also, it is confirmed that the SNR identified through the second antenna module 530 tends to decrease as the signal transmission location changes from −90 degrees to 90 degrees.

Referring to FIG. 8A, it is confirmed that the SNR identified through the first antenna module 510 is smaller than the SNR identified through the second antenna module 530 before about −20 degrees indicated by reference numeral 810. It is confirmed that the SNR identified through the first antenna module 510 is equal to the SNR identified through the second antenna module 530 at about −20 degrees indicated by reference numeral 810. It is confirmed that the SNR identified through the first antenna module 510 is greater than the SNR identified through the second antenna module 530 after about −20 degrees indicated by reference numeral 810.

Accordingly, in the case of selecting an antenna module to transmit/receive a wireless signal based on the SNR, it may be preferable to select the first antenna module 510 after about −20 degrees (refer to reference numeral 810) with respect to about −20 degrees and to select the second antenna module 530 before about −20 degrees (refer to reference numeral 810).

Referring to FIG. 8B, it is confirmed that the throughput identified through the first antenna module 510 tends to increase as the signal transmission location changes from −90 degrees to 90 degrees. Also, it is confirmed that the throughput identified through the second antenna module 530 tends to decrease as the signal transmission location changes from −90 degrees to 90 degrees.

Referring to FIG. 8B, it is confirmed that the throughput identified through the first antenna module 510 is smaller than the throughput identified through the second antenna module 530 before about 20 degrees indicated by reference numeral 830. It is confirmed that the throughput identified through the first antenna module 510 is equal to the throughput identified through the second antenna module 530 at about 20 degrees indicated by reference numeral 830. It is confirmed that the throughput identified through the first antenna module 510 becomes greater than the throughput identified through the second antenna module 530 after about 20 degrees indicated by reference numeral 830.

Accordingly, in the case of selecting an antenna module to transmit/receive a wireless signal based on the throughput, it may be preferable to select the first antenna module 510 after about 20 degrees (refer to reference numeral 830) with respect to about 20 degrees and to select the second antenna module 530 before about 20 degrees (refer to reference numeral 830).

However, in the case of selecting an antenna module to transmit/receive a wireless signal based on any one reference between about −20 degrees indicated by reference numeral 810 and about 20 degrees indicated by reference numeral 830, it is difficult to draw an optimum result. For example, in the case of selecting an antenna module to transmit/receive a wireless signal based on the SNR, between about −20 degrees indicated by reference numeral 810 and about 20 degrees indicated by reference numeral 830, the throughput of the electronic device 101 may be lower than an optimum throughput. For another example, in the case of selecting an antenna module to transmit/receive a wireless signal based on the throughput, before about −20 degrees indicated by reference numeral 810 and after 20 degrees indicated by reference numeral 830, a resource for calculating the throughput of the electronic device 101 may be consumed.

Accordingly, embodiments of this disclosure consider the trade-off between a communication speed and a computing load. Below, an operation of the electronic device 101 according to an embodiment of the disclosure will be described with reference to FIGS. 9 and 10.

Figure 9:
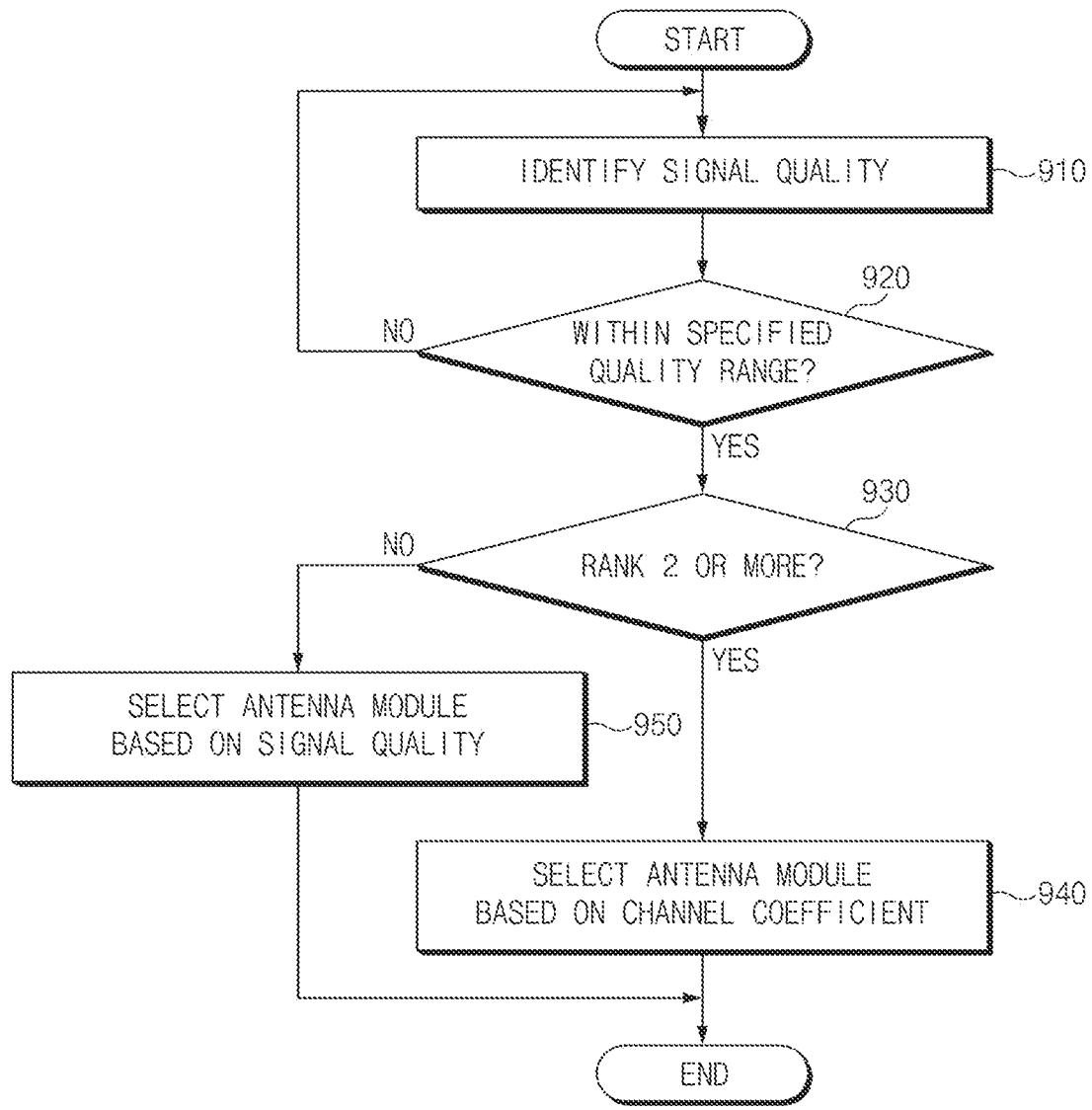
FIG. 9 is a flowchart illustrating an operation in which an electronic device according to an embodiment selects an antenna module.

FIG. 9 is a flowchart illustrating an operation in which an electronic device according to an embodiment selects an antenna module. Below, FIG. 9 will be described with reference to the components of FIGS. 1 to 5.

Referring to FIG. 9, in operation 910, the processor 120 (e.g., a communication processor (CP)) of the electronic device 101 may identify a signal quality. In an embodiment, the signal quality may be based on at least one of an SNR, a received signal strength indication (RSSI), a carrier to interference and noise ratio (CINR), a signal to interference ratio (SIR), a reference signal received power (RSRP), or a reference signal received quality (RSRQ).

In an embodiment, the processor 120 may identify a signal quality for a specified wireless signal. In an embodiment, the processor 120 may identify a signal quality for a specified wireless signal through the first antenna module 510 and/or the second antenna module 530. In an embodiment, while transmitting and/or receiving a wireless signal through the first antenna module 510, the processor 120 may identify a signal quality for a specified wireless signal through the first antenna module 510 and/or the second antenna module 530. In an embodiment, the specified wireless signal may include a synchronization signal and/or a reference signal. In an embodiment, the synchronization signal may include a signal that is based on a synchronization signal block (SSB). In an embodiment, the synchronization signal may include a primary synchronization signal (PSS), a secondary synchronization signal (SSS), a physical broadcasting channel (PBCH), or a combination thereof. In an embodiment, the reference signal may include a cell specific reference signal (CRS). In an embodiment, the reference signal may include a channel-state information reference signal (CSI-RS), a sounding reference signal (SRS), a demodulation reference signal (DMRS), a phase tracking reference signal (PTRS), or a combination thereof.

In operation 920, the processor 120 may verify whether the signal quality is within a specified quality range. In an embodiment, the processor 120 may verify whether a difference value between a first signal quality through the first antenna module 510 and a second signal quality through the second antenna module 530 is within the specified quality range. In an embodiment, the processor 120 may verify whether an absolute value of the difference value between the first signal quality through the first antenna module 510 and the second signal quality through the second antenna module 530 is within the specified quality range. In an embodiment, while transmitting and/or receiving a wireless signal through the first antenna module 510, the processor 120 may verify whether the difference value between the first signal quality through the first antenna module 510 and the second signal quality through the second antenna module 530 is within the specified quality range.

For example, in the case where the signal quality is the SNR, the processor 120 may verify whether the signal quality is within the specified quality range, based on Equation 1 below.

$$|SNR_{selected} - SNR_{other}| \leq SNR_{Threshold} \quad \text{[Equation 1]}$$

In Equation 1, "$SNR_{selected}$" may refer to an SNR that is identified through an antenna module (e.g., the first antenna module 510) used to transmit and/or receive a wireless signal. In Equation 1, "$SNR_{Other}$" may refer to an SNR that is identified through any other antenna module (e.g., the second antenna module 530) other than the antenna module used to transmit and/or receive a wireless signal. In Equation 1, "$SNR_{Threshold}$" may refer to an SNR indicating a specified quality.

For example, referring to Equation 1, in the case where the second antenna module 530 is used to transmit and/or receive a wireless signal and "$SNR_{Threshold}$" is 3 dB, assuming that a transmission angle of a specified wireless signal is −40 degrees of FIG. 8A, "$SNR_{selected}$" may be 20 dB and "$SNR_{Other}$" may be 15 dB. In this case, the processor 120 may identify that the signal quality exceeds the specified quality range.

For another example, referring to Equation 1, in the case where the second antenna module 530 is used to transmit and/or receive a wireless signal and "$SNR_{Threshold}$" is 3 dB, assuming that a transmission angle of a specified wireless signal is about −20 degrees (refer to reference numeral 810) of FIG. 8A, "$SNR_{selected}$" and "$SNR_{Other}$" may be equal. In this case, the processor 120 may identify that the signal quality is within the specified quality range.

In an embodiment, in the case where the signal quality is the RSSI, the processor 120 may measure the RSSI through each of the antenna modules 510 and 530 and may verify whether the signal quality is within the specified quality range, based on a result of determining whether a difference between the RSSI of one antenna module (e.g., the first antenna module 510) used to transmit and/or receive a wireless signal and the RSSI of the other antenna module (e.g., the second antenna module 530) is within a threshold RSSI.

In an embodiment, in the case where the signal quality is the CINR, the processor 120 may measure the CINR through each of the antenna modules 510 and 530 and may verify whether the signal quality is within the specified quality range, based on a result of comparing whether a difference between the CINR of one antenna module (e.g., the first antenna module 510) used to transmit and/or receive a wireless signal and the CINR of the other antenna module (e.g., the second antenna module 530) is within a threshold CINR.

In another embodiment, as in the RSSI or CINR, the processor 120 may verify whether the signal quality is within the specified quality range, based on the SIR, the RSRP, or the RSRQ.

When it is verified in operation 920 that the signal quality is within the specified quality range ("Yes" determined), the processor 120 may perform operation 930. When it is verified in operation 920 that the signal quality exceeds the specified quality range ("No" determined), the processor 120 may repeatedly perform operation 910.

In operation 930, the processor 120 may verify whether the rank of the antenna modules (i.e., the first antenna module 510 and the second antenna module 530) is 2 or more. In an embodiment, the processor 120 may verify whether the rank of reception paths of the antenna modules (i.e., the first antenna module 510 and the second antenna module 530) is 2 or more. Herein, the rank may indicate the number of signal paths (e.g., a transmission path and/or a reception path) independent of each other. In an embodiment, the case where the rank of the first antenna module 510 or the second antenna module 530 is "1" may mean that antennas of the first antenna module 510 or antennas of the second antenna module 530 transmit/receive wireless signals through the same signal path. In an embodiment, the case where the rank of the first antenna module 510 or the second antenna module 530 is 2 or more may mean that the antennas of the first antenna module 510 or the antennas of the second antenna module 530 transmit/receive wireless signals through signal paths, the number of which correspond to the rank. In an embodiment, the case where the rank is "1" may indicate that a wireless communication environment is an environment in which a single polarization is used. In an embodiment, the case where the rank is "2" may indicate that a wireless communication environment is an environment in which two polarizations are used. In an embodiment, an increase in the rank may indicate that the number of polarizations that a wireless communication environment uses also increases.

When it is verified in operation 930 that the rank is 2 or more ("Yes" determined), the processor 120 may perform operation 940. When it is verified in operation 930 that the rank is "1" ("No" determined), the processor 120 may perform operation 950.

In operation 940, the processor 120 may select an antenna module based on channel information. In an embodiment, the processor 120 may select an antenna module based on a channel coefficient. In an embodiment, the processor 120 may select an antenna module by using a parameter obtained based on the channel coefficient. In an embodiment, the parameter may include a throughput, a channel correlation, a condition number, or a combination thereof.

In an embodiment, the processor 120 may select an antenna module to transmit/receive a wireless signal, based on a first throughput through the first antenna module 510 and a second throughput through the second antenna module 530. In an embodiment, the processor 120 may select an antenna module having the highest throughput of the first throughput and the second throughput, as an antenna module to transmit/receive a wireless signal.

For example, the processor 120 may select an antenna module to transmit/receive a wireless signal, based on a throughput identified based on Equation 2 below. In an embodiment, Equation 2 below may be an equation for obtaining a Shannon capacity in the MIMO (multi input multi output).

$$TP = \log\det\left|I + \begin{bmatrix} S_{1,1} & S_{1,2} \\ S_{2,1} & S_{2,2} \end{bmatrix} \cdot \begin{bmatrix} S_{1,1} & S_{1,2} \\ S_{2,1} & S_{2,2} \end{bmatrix}^H\right| \quad \text{[Equation 2]}$$

In Equation 2, "TP" may indicate a throughput. In Equation 2, "I" may indicate a unit matrix of order 2 or an identity matrix of order 2. In Equation 2, "$S_{i,j}$" may indicate a channel coefficient of a path in which a signal polarized in a j-th direction is received through an antenna polarized in an i-th direction. In Equation 2, "$S_{1,1}$" may indicate a channel coefficient of a path in which a signal polarized in the first direction is received through an antenna polarized in the first direction. In Equation 2, "$S_{1,2}$" may indicate a channel coefficient of a path in which a signal polarized in the second direction is received through an antenna polarized in the first direction. In Equation 1, "$S_{2,1}$" may indicate a channel coefficient of a path in which a signal polarized in the first direction is received through an antenna polarized in the second direction. In Equation 2, "$S_{2,2}$" may indicate a channel coefficient of a path in which a signal polarized in the second direction is received through an antenna polarized in the second direction. In Equation 2, "H" may be a conjugate transpose operator of a matrix. Equation 2 shows that "TP" is calculated through the matrix of order 2, only as an example. In an embodiment, in the case where the rank is "n" (n being an integer of 2 or more), "TP" may be calculated through a matrix or order n.

For example, in the case where the second antenna module 530 is used to transmit and/or receive a wireless signal, assuming that a transmission angle of a specified wireless signal is about −20 degrees or more (refer to 810 of FIG. 8B) and about 20 degrees or less (refer to 830 of FIG. 8B), the throughput of the second antenna module 530 may be higher than the throughput of the first antenna module 510; in this case, the processor 120 may select the second antenna module 530 as an antenna module to transmit/receive the wireless signal.

In an embodiment, the processor 120 may select an antenna module to transmit/receive a wireless signal, based on a first channel correlation through the first antenna module 510 and a second channel correlation through the second antenna module 530. In an embodiment, the processor 120 may select an antenna module to transmit/receive a wireless signal, based on a first weighted channel correlation identified based on the first channel correlation and a second weighted channel correlation identified based on the second channel correlation. In an embodiment, the processor 120 may select an antenna module having the highest weighted channel correlation of the first weighted channel correlation and the second weighted channel correlation, as an antenna module to transmit/receive a wireless signal.

For example, the processor 120 may select an antenna module to transmit/receive a wireless signal, based on a weighted channel correlation identified based on Equation 3 and Equation 4 below.

$$\rho = \left|\frac{\overline{S}_i \cdot \overline{S}_j^H}{\sqrt{|\overline{S}_i| \cdot |\overline{S}_j^H|}}\right| \quad \text{[Equation 3]}$$

$$\rho_w = SNR + \alpha \cdot (1 - \rho) \quad \text{[Equation 4]}$$

In Equation 3, $\rho$ may be a channel correlation. In Equation 3, $\overline{S}_i = [S_{j,i}\ S_{i,j}]$.

In Equation 3, $\overline{S}_i = [S_{j,i}\ S_{j,j}]$. In Equation 3, "H" may be a conjugate transpose operator of a matrix.

In Equation 4, $\rho_w$ may be a weighted channel correlation. In Equation 4, "SNR" may be an SNR identified through a corresponding antenna module. In Equation 4, $\alpha$ may be a weight.

In an embodiment, the processor 120 may select an antenna module having a high weighted channel correlation of a weighted channel correlation of the first antenna module 510 and a weighted channel correlation of the second antenna module 530, as an antenna module to transmit/receive a wireless signal.

In an embodiment, the processor 120 may select an antenna module to transmit/receive a wireless signal, based on a first condition number through the first antenna module 510 and a second condition number through the second antenna module 530. In an embodiment, the processor 120 may select an antenna module to transmit/receive a wireless signal, based on a first adjustment condition number identified based on the first condition number and a second adjustment condition number identified based on the second condition number. In an embodiment, the processor 120 may select an antenna module having the highest adjustment condition number of the first adjustment condition number the second adjustment condition number, as an antenna module to transmit/receive a wireless signal.

For example, the processor 120 may select an antenna module to transmit/receive a wireless signal, based on an adjustment condition number identified based on Equation 5 and Equation 6 below.

$$\lambda = \frac{\sigma_{max}}{\sigma_{min}} \quad \text{[Equation 5]}$$

$$\lambda_a = SNR \cdot \lambda \quad \text{[Equation 6]}$$

In Equation 5, $\lambda$ may be a condition number. In Equation 5, $\sigma_{max}$ may be the greatest singular value of a channel matrix. In Equation 5, $\sigma_{min}$ may be the smallest singular value of a channel matrix.

In Equation 6, $\lambda_\alpha$ may be an adjustment condition number. In Equation 6, "SNR" may be an SNR identified through a corresponding antenna module.

For example, the processor 120 may select an antenna module having a high adjustment condition number of an adjustment condition number of the first antenna module 510 and an adjustment condition number of the second antenna module 530, as an antenna module to transmit/receive a wireless signal.

In operation 950, the processor 120 may select an antenna module based on the signal quality. For example, when the signal quality is the SNR, the processor 120 may select an antenna module having the highest SNR of an SNR of the first antenna module 510 and an SNR of the second antenna module 530, as an antenna module to transmit/receive a wireless signal.

As described with reference to FIG. 9, the electronic device 101 according to an embodiment of the disclosure may select an antenna module to transmit/receive a wireless signal based on channel information, in a specific region (e.g., a region in which a signal quality difference is within the specified quality range). As such, the electronic device 101 according to an embodiment of the disclosure may select an optimum antenna module in consideration of the trade-off between the communication speed and the computing load.

In another embodiment, the order of operations of FIG. 9 may be interchanged. For example, after identifying the rank of the received wireless signal, the electronic device 101 may identify a quality of the received wireless signal. In this case, when the rank is "1", the electronic device 101 may not determine whether the quality of the received wireless signal is within the specified quality range and may select an antenna module based on the signal quality. Also, when the rank is "2", the electronic device 101 may determine whether the quality of the received wireless signal is within the specified quality range; when the quality of the received wireless signal is within the specified quality range, the electronic device 101 may select an antenna module based on the channel coefficient.

In an embodiment, the operations of FIG. 9 may be applied even to the case where the electronic device 101 includes three or more antenna modules. For example, the electronic device 101 may identify qualities of wireless signals received through three or more antenna modules, and may compare the quality of the wireless signal received through an antenna module under operation and the quality of the wireless signal received through each of antenna modules being at an idle state. In this case, the electronic device 101 may select an antenna module based on the wireless signal of the antenna module under operation and the wireless signal of the idle antenna module whose quality is within the specified quality range. Alternatively, the electronic device 101 may select an antenna module based on the wireless signal of the antenna module under operation, and the wireless signal of the idle antenna module, which has the smallest difference with the wireless signal of the antenna module under operation.

Figure 10:
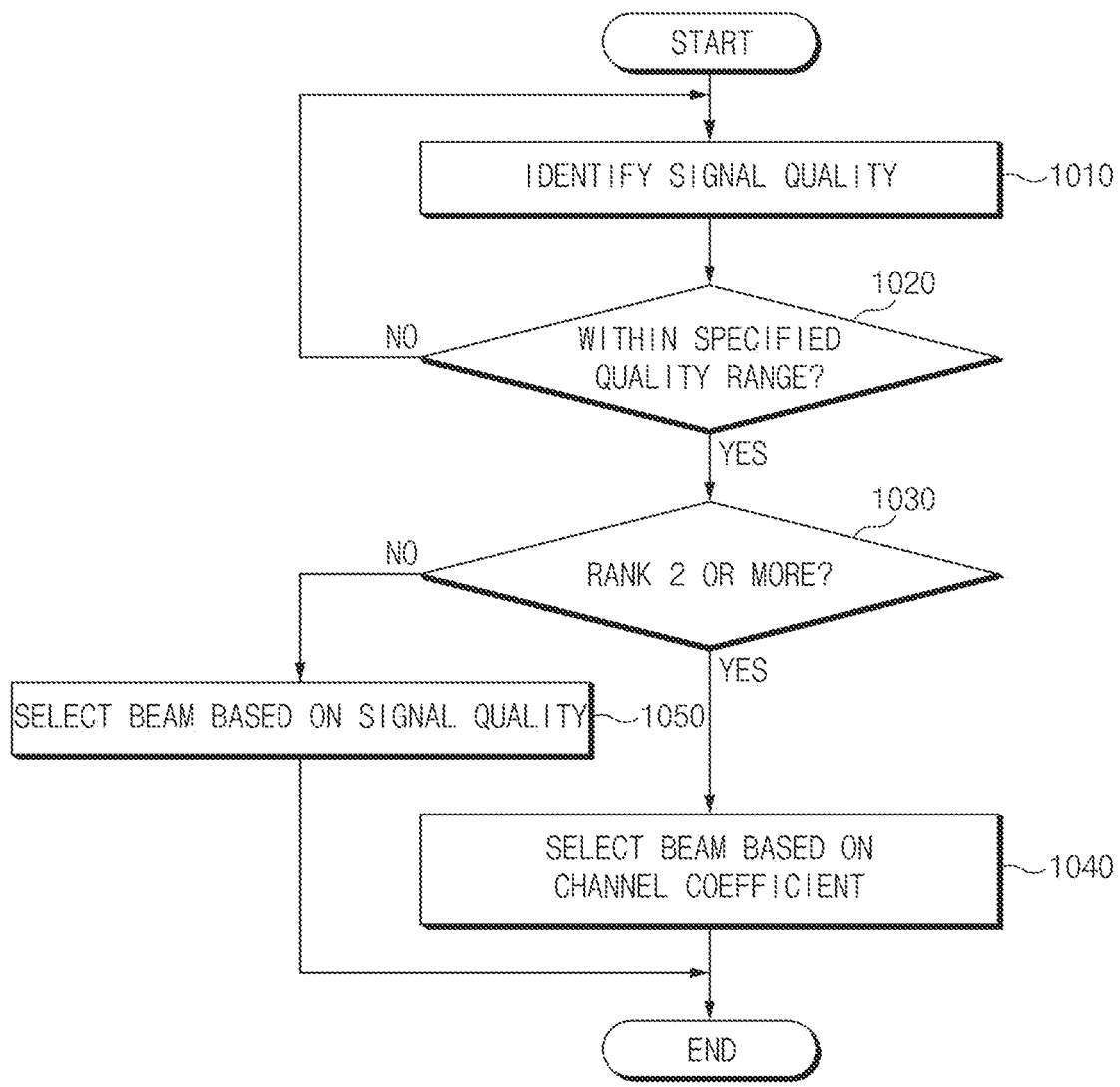
FIG. 10 is a flowchart illustrating an operation in which an electronic device according to an embodiment selects a beam.

FIG. 10 is a flowchart illustrating an operation in which an electronic device according to an embodiment selects a beam. Below, FIG. 10 will be described with reference to the components of FIGS. 1 to 5.

Referring to FIG. 10, in operation 1010, the processor 120 (e.g., a communication processor (CP)) of the electronic device 101 may identify a signal quality. In an embodiment, the signal quality may be based on at least one of the SNR, the RSSI, the CINR, the SIR, the RSRP, or the RSRQ.

In an embodiment, the processor 120 may identify a signal quality for a specified wireless signal through the plurality of beams 520 of the first antenna module 510 and/or the plurality of beams 540 of the second antenna module 530. In an embodiment, the specified wireless signal may include a synchronization signal and/or a reference signal. In an embodiment, the synchronization signal may include a signal that is based on the SSB. In an embodiment, the synchronization signal may include the PSS, the SSS, the PBCH, or a combination thereof. In an embodiment, the reference signal may include the cell specific reference signal (CRS). In an embodiment, the synchronization signal may include the CSI-RS, the SRS, the DMRS, the PTRS, or a combination thereof.

In an embodiment, the processor 120 may identify the signal quality of the specified wireless signal through each of the plurality of beams 520 of the first antenna module 510. In an embodiment, the processor 120 may identify the signal quality of the specified wireless signal through each of the plurality of beams 540 of the second antenna module 530.

In an embodiment, in the case where a beam (e.g., the beam 523) of the first antenna module 510 is used to transmit and/or receive a wireless signal, the processor 120 may identify the signal quality for the specified wireless signal through: 1) the beam (e.g., the beam 523) used to transmit and/or receive the wireless signal from among the plurality of beams 520 of the first antenna module 510; or 2) the beams (e.g., the beams 522 and 524 or the beams 521, 522, 524, and 525) neighboring the beam (e.g., the beam 523).

In an embodiment, in the case where a beam (e.g., the beam 523) of the first antenna module 510 is used to transmit and/or receive a wireless signal, the processor 120 may identify the signal quality for the specified wireless signal through: 1) the beam (e.g., the beam 523) used to transmit and/or receive the wireless signal from among the plurality of beams 520 of the first antenna module 510; and 2) the beams (e.g., the beams 521 and 525) not neighboring the beam (e.g., the beam 523).

In an embodiment, in the case where a beam (e.g., the beam 523) of the first antenna module 510 is used to transmit and/or receive a wireless signal, the processor 120 may identify the signal quality for the specified wireless signal through a specified number of beams among the plurality of beams 540 of the second antenna module 530.

In an embodiment, in the case where a beam (e.g., the beam 523) of the first antenna module 510 is used to transmit and/or receive a wireless signal, the processor 120 may identify the signal quality for the specified wireless signal through a specified number of neighboring beams (e.g., the beams 542, 543, and 544) among the plurality of beams 540 of the second antenna module 530.

In an embodiment, in the case where a beam (e.g., the beam 523) of the first antenna module 510 is used to transmit and/or receive a wireless signal, the processor 120 may identify the signal quality for the specified wireless signal through a specified number of beams (e.g., the beams 541, 543, and 545) spaced from each other from among the plurality of beams 540 of the second antenna module 530.

In an embodiment, in the case where a beam (e.g., the beam 523) of the first antenna module 510 is used to transmit and/or receive a wireless signal, the processor 120 may identify the signal quality for the specified wireless signal through a specified beam among the plurality of beams 540 of the second antenna module 530.

In an embodiment, in the case where a beam (e.g., the beam 543) of the second antenna module 530 is used to transmit and/or receive a wireless signal, the processor 120 may identify the signal quality for the specified wireless signal through: 1) the beam (e.g., the beam 543) used to transmit and/or receive the wireless signal from among the plurality of beams 540 of the second antenna module 530; and 2) the beams (e.g., the beams 542 and 544 or the beams 541, 542, 544, and 545) neighboring the beam (e.g., the beam 543).

In an embodiment, in the case where a beam (e.g., the beam 543) of the second antenna module 530 is used to transmit and/or receive a wireless signal, the processor 120 may identify the signal quality for the specified wireless signal through: 1) the beam (e.g., the beam 543) used to transmit and/or receive the wireless signal from among the plurality of beams 540 of the second antenna module 530; and 2) the beams (e.g., the beams 541 and 545) not neighboring the beam (e.g., the beam 543).

In an embodiment, in the case where a beam (e.g., the beam 543) of the second antenna module 530 is used to transmit and/or receive a wireless signal, the processor 120 may identify the signal quality for the specified wireless signal through a specified number of beams among the plurality of beams 520 of the first antenna module 510.

In an embodiment, in the case where a beam (e.g., the beam 543) of the second antenna module 530 is used to transmit and/or receive a wireless signal, the processor 120 may identify the signal quality for the specified wireless signal through a specified number of neighboring beams (e.g., the beams 522, 523, and 524) among the plurality of beams 520 of the first antenna module 510.

In an embodiment, in the case where a beam (e.g., the beam 543) of the second antenna module 530 is used to transmit and/or receive a wireless signal, the processor 120 may identify the signal quality for the specified wireless signal through a specified number of beams (e.g., the beams 521, 523, and 525) spaced from each other from among the plurality of beams 520 of the first antenna module 510.

In an embodiment, in the case where a beam (e.g., the beam 543) of the second antenna module 530 is used to transmit and/or receive a wireless signal, the processor 120 may identify the signal quality for the specified wireless signal through a specified beam among the plurality of beams 520 of the first antenna module 510.

In operation 1020, the processor 120 may verify whether the signal quality is within the specified quality range.

In operation 1020, the processor 120 may verify whether each of difference values between signal qualities of beams is within the specified quality range. In an embodiment, the processor 120 may verify whether a difference value between a signal quality of a beam (e.g., the beam 523) used to transmit and/or receive a wireless signal and a signal quality of each of the remaining beams is within the specified quality range. In an embodiment, the processor 120 may verify whether an absolute value of a difference value between a signal quality of a beam (e.g., the beam 523) used to transmit and/or receive a wireless signal and a signal quality of each of the remaining beams is within the specified quality range.

For example, in the case where the signal quality is the SNR, the processor 120 may verify whether the signal quality is within the specified quality range, based on Equation 1 above.

When it is verified in operation 1020 that the signal quality is within the specified quality range ("Yes" determined), the processor 120 may perform operation 1030. When it is verified in operation 1020 that the signal quality exceeds the specified quality range ("No" determined), the processor 120 may repeatedly perform operation 1010.

In operation 1030, the processor 120 may verify whether the rank of the antenna modules (i.e., the first antenna module 510 and the second antenna module 530) is 2 or more. In an embodiment, the processor 120 may verify whether the rank of reception paths of the antenna modules (i.e., the first antenna module 510 and the second antenna module 530) is 2 or more.

When it is verified in operation 1030 that the rank is 2 or more ("Yes" determined), the processor 120 may perform operation 1040. When it is verified in operation 1030 that the rank is "1" ("No" determined), the processor 120 may perform operation 1050.

In operation 1040, the processor 120 may select a beam based on channel information. In an embodiment, the processor 120 may select a beam based on a channel coefficient. In an embodiment, the processor 120 may select a beam by using a parameter obtained based on the channel coefficient. In an embodiment, the parameter may include a throughput, a channel correlation, a condition number, or a combination thereof.

In an embodiment, the processor 120 may select an antenna module to transmit/receive a wireless signal, based on a first throughput of a beam (e.g., the beam 523) used to transmit and/or receive a wireless signal and a second throughput of each of the remaining beams. In an embodiment, the processor 120 may select a beam having the highest throughput of the first throughput and the second throughput, as a beam to transmit/receive a wireless signal.

In an embodiment, the processor 120 may select a beam to transmit/receive a wireless signal, based on a first channel correlation through a beam (e.g., the beam 523) used to transmit and/or receive a wireless signal and a second channel correlation through each of the remaining beams. In an embodiment, the processor 120 may select a beam to transmit/receive a wireless signal, based on a first weighted channel correlation identified based on the first channel correlation and a second weighted channel correlation identified based on the second channel correlation. In an embodiment, the processor 120 may select a beam having the highest weighted channel correlation of the first weighted channel correlation and the second weighted channel correlation, as a beam to transmit/receive a wireless signal.

In an embodiment, the processor 120 may select a beam to transmit/receive a wireless signal, based on a first condition number through a beam (e.g., the beam 523) used to transmit and/or receive a wireless signal and a second condition number through each of the remaining beams. In an embodiment, the processor 120 may select a beam to transmit/receive a wireless signal, based on a first adjustment condition number identified based on the first condition number and a second adjustment condition number identified based on the second condition number. In an embodiment, the processor 120 may select a beam having the highest adjustment condition number of the first adjustment condition number the second adjustment condition number, as a beam to transmit/receive a wireless signal.

In operation 1050, the processor 120 may select a beam based on the signal quality. In an embodiment, in the case where the signal quality is the SNR, the processor 120 may select a beam having the highest SNR among an SNR through a beam (e.g., the beam 523) used to transmit and/or receive a wireless signal and an SNR through each of the remaining beams, as a beam to transmit/receive a wireless signal.

In an embodiment, in the case where the selected beam corresponds to a beam of an antenna module different from an antenna module forming a beam used to transmit and/or receive a wireless signal, the processor 120 may perform an operation of changing an antenna module that is used to transmit and/or receive a wireless signal.

As described with reference to FIG. 10, the electronic device 101 according to an embodiment of the disclosure may select a beam to transmit/receive a wireless signal based on channel information, in a specific region (e.g., a region in which a signal quality difference is within the specified quality range). As such, the electronic device 101 according to an embodiment of the disclosure may select an optimum beam in consideration of the trade-off between the communication speed and the computing load.

In another embodiment, the order of operations of FIG. 10 may be interchanged. For example, after identifying the rank of the received wireless signal, the electronic device 101 may identify a quality of the received wireless signal. In this case, when the rank is "1", the electronic device 101 may not determine whether the quality of the received wireless signal is within the specified quality range and may select a beam based on the signal quality. Also, when the rank is "2", the electronic device 101 may determine whether the quality of the received wireless signal is within the specified quality range; when the quality of the received wireless signal is within the specified quality range, the electronic device 101 may select a beam based on the channel coefficient.

In an embodiment, the operations of FIG. 10 may be applied even to the case where the electronic device 101 includes three or more antenna modules. For example, the electronic device 101 may identify qualities of wireless signals received through beams of three or more antenna modules, and may compare the quality of the wireless signal received through a beam of an antenna module under operation and the quality of the wireless signal received through a beam of each antenna module being at an idle state. In this case, the electronic device 101 may select a beam based on the wireless signal of the beam of the antenna module under operation and the wireless signal of the beam of the idle antenna module whose quality is within the specified quality range. Alternatively, the electronic device 101 may select a beam based on the wireless signal of the beam of the antenna module under operation, and the wireless signal of the beam of the idle antenna module, which has the smallest difference with the wireless signal of the beam of the antenna module under operation.

In an embodiment, the operations of FIG. 10 may be applied even to the case where the electronic device 101 includes one antenna module. For example, the electronic device 101 may identify qualities of wireless signals received through two or more beams of one antenna module, and may compare the quality of the wireless signal received through a beam under operation and the quality of the wireless signal received through a beam being at an idle state. In this case, the electronic device 101 may select a beam based on the wireless signal of the beam under operation and the wireless signal of the idle beam whose quality is within the specified quality range. Alternatively, the electronic device 101 may select a beam based on the wireless signal of the beam under operation, and the wireless signal of the idle beam, which receives a wireless signal having the smallest difference with the wireless signal of the beam under operation.

Figure 11:
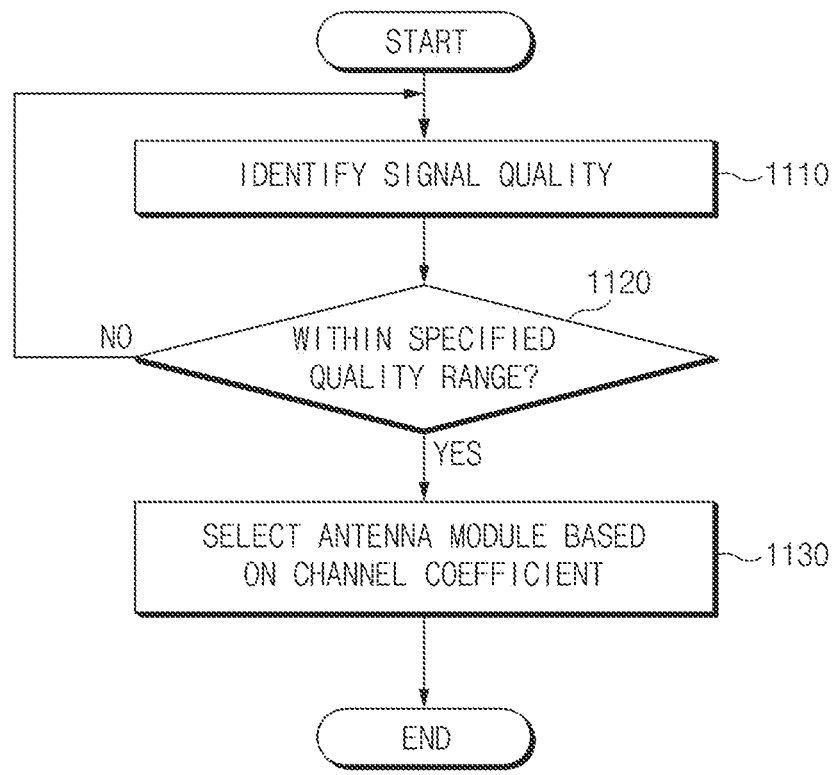
FIG. 11 is a flowchart illustrating an operation in which an electronic device according to an embodiment selects an antenna module.

FIG. 11 is a flowchart illustrating an operation in which an electronic device according to an embodiment selects an antenna module. Below, FIG. 11 will be described with reference to the components of FIGS. 1 to 5.

Referring to FIG. 11, in operation 1110, the processor 120 (e.g., a communication processor (CP)) of the electronic device 101 may identify a signal quality. In an embodiment, the signal quality may be based on at least one of the SNR, the RSSI, the CINR, the SIR, the RSRP, or the RSRQ.

In an embodiment, the processor 120 may identify a signal quality for a specified wireless signal. In an embodiment, the processor 120 may identify a signal quality for a specified wireless signal through the first antenna module 510 and/or the second antenna module 530. In an embodiment, while transmitting and/or receiving a wireless signal through the first antenna module 510, the processor 120 may identify a signal quality for a specified wireless signal through the first antenna module 510 and/or the second antenna module 530. In an embodiment, the specified wireless signal may include a synchronization signal and/or a reference signal. In an embodiment, the synchronization signal may include a signal that is based on the SSB. In an embodiment, the synchronization signal may include the PSS, the SSS, the PBCH, or a combination thereof. In an embodiment, the reference signal may include the cell specific reference signal (CRS). In an embodiment, the synchronization signal may include the CSI-RS, the SRS, the DMRS, the PTRS, or a combination thereof.

In operation 1120, the processor 120 may verify whether the signal quality is within the specified quality range. In an embodiment, the processor 120 may verify whether a difference value between a first signal quality through the first antenna module 510 and a second signal quality through the second antenna module 530 is within the specified quality range. In an embodiment, the processor 120 may verify whether an absolute value of the difference value between the first signal quality through the first antenna module 510 and the second signal quality through the second antenna module 530 is within the specified quality range. In an embodiment, while transmitting and/or receiving a wireless signal through the first antenna module 510, the processor 120 may verify whether the difference value between the first signal quality through the first antenna module 510 and the second signal quality through the second antenna module 530 is within the specified quality range.

When it is verified in operation 1120 that the signal quality is within the specified quality range ("Yes" determined), the processor 120 may perform operation 1130. When it is verified in operation 1120 that the signal quality exceeds the specified quality range ("No" determined), the processor 120 may repeatedly perform operation 1110.

In an embodiment, in the case where the signal quality is within the specified quality range, the processor 120 may verify whether the rank of antenna modules (i.e., the first antenna module 510 and the second antenna module 530) is 2 or more. In an embodiment, the processor 120 may verify whether the rank of reception paths of the antenna modules (i.e., the first antenna module 510 and the second antenna module 530) is 2 or more. In an embodiment, in the case where the signal quality is within the specified quality range and the rank of the antenna modules (i.e., the first antenna module 510 and the second antenna module 530) is 2 or more, the processor 120 may perform operation 1130.

In operation 1130, the processor 120 may select an antenna module based on channel information. In an embodiment, the processor 120 may select an antenna module based on a channel coefficient. In an embodiment, the processor 120 may select an antenna module by using a parameter obtained based on the channel coefficient. In an embodiment, the parameter may include a throughput, a channel correlation, a condition number, or a combination thereof.

In an embodiment, the processor 120 may select an antenna module to transmit/receive a wireless signal, based on a first throughput through the first antenna module 510 and a second throughput through the second antenna module 530. In an embodiment, the processor 120 may select an antenna module having the highest throughput of the first throughput and the second throughput, as an antenna module to transmit/receive a wireless signal.

In an embodiment, the processor 120 may select an antenna module to transmit/receive a wireless signal, based on a first channel correlation through the first antenna module 510 and a second channel correlation through the second antenna module 530. In an embodiment, the processor 120 may select an antenna module to transmit/receive a wireless signal, based on a first weighted channel correlation identified based on the first channel correlation and a second weighted channel correlation identified based on the second channel correlation. In an embodiment, the processor 120 may select an antenna module having the highest weighted channel correlation of the first weighted channel correlation and the second weighted channel correlation, as an antenna module to transmit/receive a wireless signal.

In an embodiment, the processor 120 may select an antenna module to transmit/receive a wireless signal, based on a first condition number through the first antenna module 510 and a second condition number through the second antenna module 530. In an embodiment, the processor 120 may select an antenna module to transmit/receive a wireless signal, based on a first adjustment condition number identified based on the first condition number and a second adjustment condition number identified based on the second condition number. In an embodiment, the processor 120 may select an antenna module having the highest adjustment condition number of the first adjustment condition number the second adjustment condition number, as an antenna module to transmit/receive a wireless signal.

As described with reference to FIG. 11, the electronic device 101 according to an embodiment of the disclosure may select an antenna module to transmit/receive a wireless signal based on channel information, in a specific region (e.g., a region in which a signal quality difference is within the specified quality range). As such, the electronic device 101 according to an embodiment of the disclosure may select an optimum antenna module in consideration of the trade-off between the communication speed and the computing load.

Figure 12A:
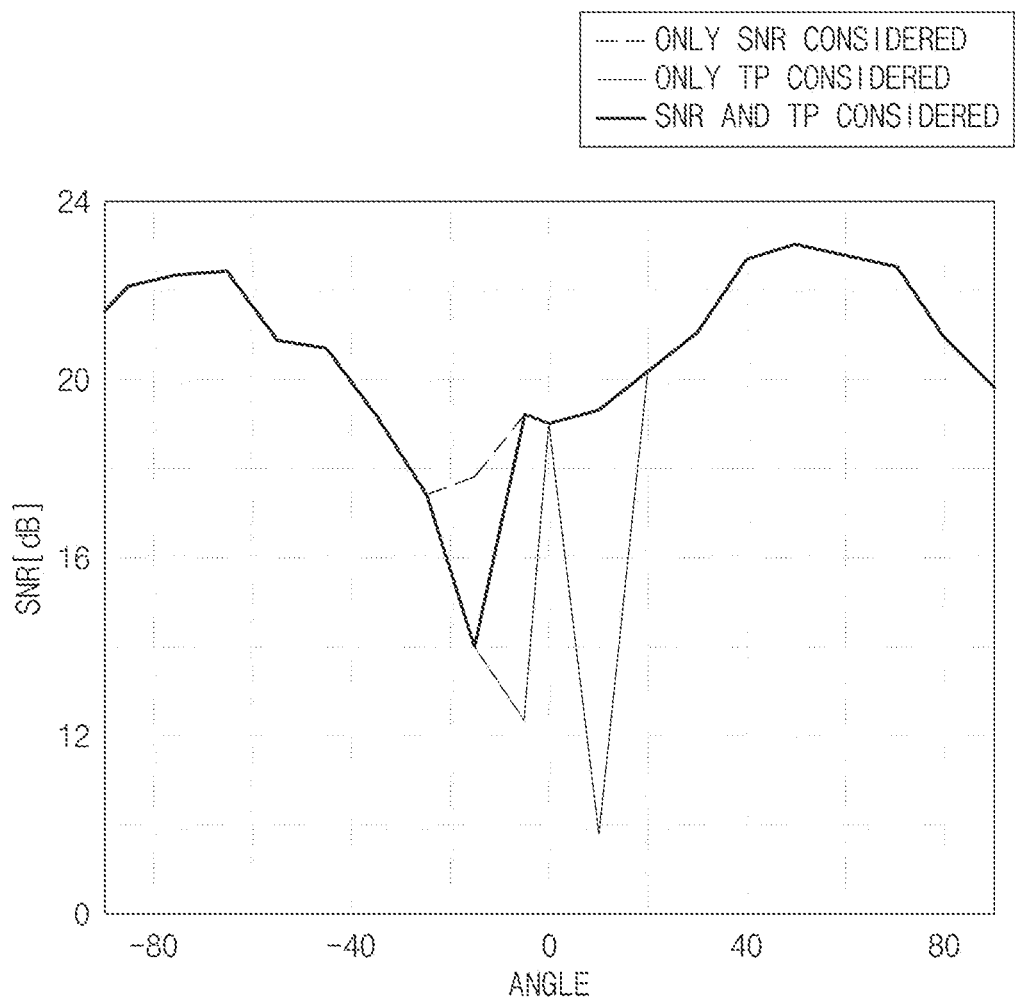
FIG. 12A is a graph illustrating a change of an SNR according to an antenna module selecting manner.
Figure 12B:
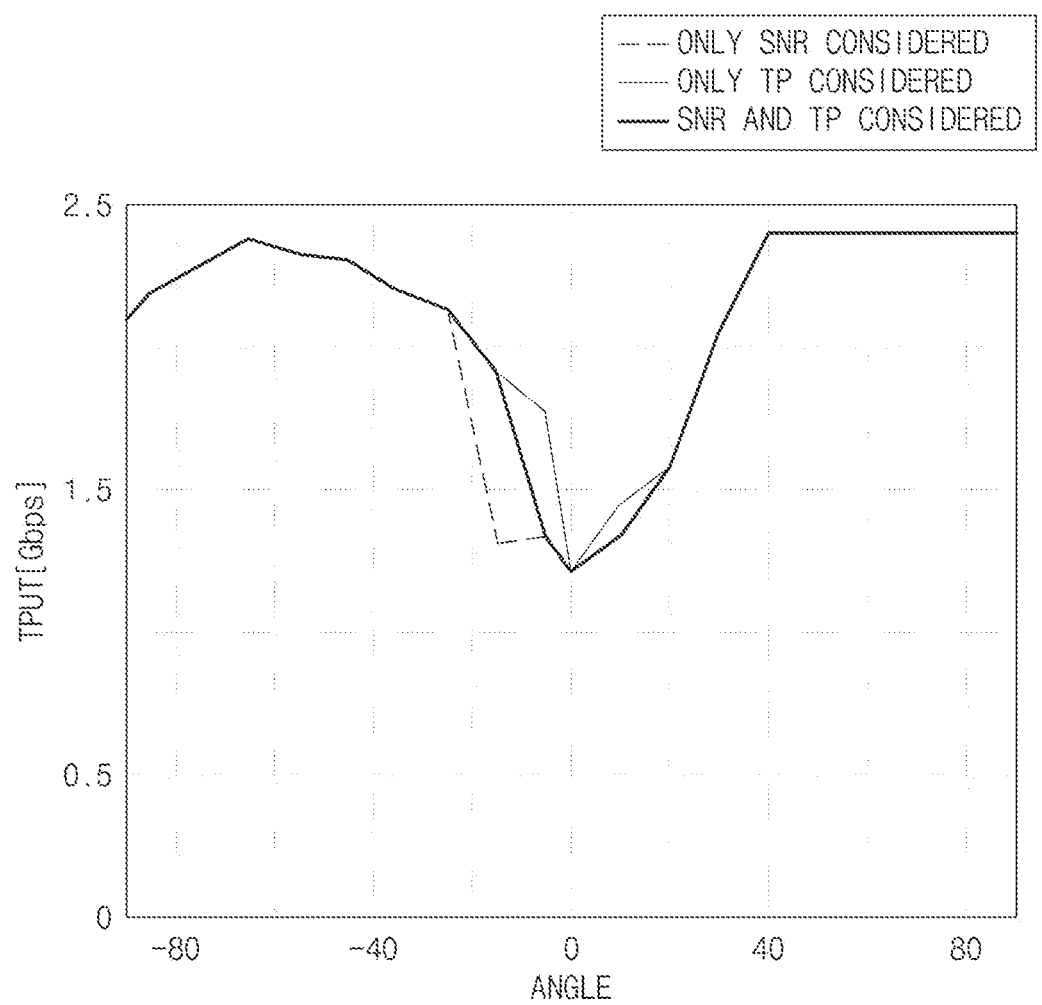
FIG. 12B is a graph illustrating a change of a throughput according to an antenna module selecting manner.

FIG. 12A is a graph illustrating a change of an SNR according to an antenna module selecting manner. FIG. 12B is a graph illustrating a change of a throughput according to an antenna module selecting manner.

Referring to FIG. 12A, in the case where only the SNR is considered upon selecting an antenna module, an antenna module to transmit/receive a wireless signal may have the maximum SNR at any angle. Next, in the case where only the throughput is considered upon selecting an antenna module, an antenna module to transmit/receive a wireless signal may have an SNR lower than the maximum SNR in a region from −20 degrees to 20 degrees. Finally, in the case where both the SNR and the throughput are considered upon selecting an antenna module, an antenna module to transmit/receive a wireless signal may have an SNR lower than the maximum SNR in a region from −a degree to b degree but may have the maximum SNR in the remaining region.

In contrast, referring to FIG. 12B, in the case where only the SNR is considered upon selecting an antenna module, an antenna module to transmit/receive a wireless signal may have an SNR lower than the maximum throughput in a region from −20 degrees to 20 degrees. In the case where only the throughput is considered upon selecting an antenna module, an antenna module to transmit/receive a wireless signal may have the maximum throughput at any angle. In the case where both the SNR and the throughput are considered upon selecting an antenna module, an antenna module to transmit/receive a wireless signal may have a higher SNR than in the case where only the SNR is considered in a region from −a degree to b degree. Also, in the case where both the SNR and the throughput are considered upon selecting an antenna module, an operation of calculating a throughput may not be performed in the remaining region other than region from −a degree to b degree, and thus, a computational amount may decrease compared to the case of considering only the throughput.

Accordingly, the electronic device 101 according to an embodiment of the disclosure may select an optimum antenna module and/or an optimum beam in consideration of the trade-off between the communication speed and the computing load, by selecting an antenna module and/or a beam to transmit/receive a wireless signal based on a throughput, in a specific region (e.g., a region in which an SNR difference is within a specified SNR range).

According to an embodiment of the present disclosure, an electronic device 101 may include a first antenna module 510 that includes one or more antennas, a second antenna module 530 that is spaced from the first antenna module 510 and includes one or more antennas, a processor 120, and a memory 130 that stores instructions. While transmitting and/or receiving a wireless signal through the first antenna module, the instructions, when executed by the processor 120, may cause the processor 120 to receive a specified wireless signal through the first antenna module 510 and the second antenna module 530, to identify a first signal quality for the specified wireless signal of the first antenna module 510 and a second signal quality for the specified wireless signal of the second antenna module, to verify whether a difference between the first signal quality and the second signal quality is within a specified signal quality range, to determine an antenna module, which is to transmit and/or receive a wireless signal, from among the first antenna module 510 and the second antenna module 530, based on first channel information about the first antenna module 510 and second channel information about the second antenna module 530 when the difference between the first signal quality and the second signal quality is within the specified signal quality range and when a rank of a wireless channel through which the specified wireless signal is received is 2 or more, and to transmit and/or receive a wireless signal by using the determined antenna module.

In an embodiment, the instructions, when executed by the processor 120, may cause the processor 120 to determine the antenna module based on a first channel coefficient of the first channel information and a second channel coefficient of the second channel information.

In an embodiment, the instructions, when executed by the processor 120, may cause the processor 120 to identify a first estimation speed (i.e., throughput) of the first antenna module 510 based on the first channel coefficient, to identify a second estimation speed (i.e., throughput) of the second antenna module 530 based on the second channel coefficient, and to determine the antenna module based on the first estimation speed and the second estimation speed.

In an embodiment, the instructions, when executed by the processor 120, may cause the processor 120 to identify a first channel correlation of the first antenna module 510 based on the first channel coefficient, to identify a second channel correlation of the second antenna module 530 based on the second channel coefficient, and to determine the antenna module based on the first channel correlation and the second channel correlation.

In an embodiment, the instructions, when executed by the processor 120, may cause the processor 120 to identify a first weighted channel correlation based on the first channel correlation and the first signal quality, to identify a second weighted channel correlation based on the second channel correlation and the second signal quality, and to determine the antenna module based on the first weighted channel correlation and the second weighted channel correlation.

In an embodiment, the instructions, when executed by the processor 120, may cause the processor 120 to multiply a first weight and a value obtained by subtracting the first channel correlation from a first reference value, to identify the first weighted channel correlation by adding the first signal quality and a multiplying result associated with the first weight, to multiply a second weight and a value obtained by subtracting the second channel correlation from a second reference value, and to identify the second weighted channel correlation by adding the second signal quality and a multiplying result associated with the second weight.

In an embodiment, the instructions, when executed by the processor 120, may cause the processor 120 to identify a first condition number of the first antenna module 510 based on the first channel coefficient, to identify a second condition number of the second antenna module 530 based on the second channel coefficient, and to determine the antenna module based on the first condition number and the second condition number.

In an embodiment, the instructions, when executed by the processor 120, may cause the processor 120 to identify a first adjustment condition number based on the first condition number and the first signal quality, to identify a second adjustment condition number based on the second condition number and the second signal quality, and to determine the antenna module based on the first adjustment condition number and the second adjustment condition number.

In an embodiment, the instructions, when executed by the processor 120, may cause the processor 120 to identify the first adjustment condition number by multiplying the first condition number and the first signal quality, and to identify the second adjustment condition number by multiplying the second condition number and the second signal quality.

In an embodiment, the instructions, when executed by the processor 120, may cause the processor 120 to determine the antenna module to transmit and/or receive the wireless signal, based on the first signal quality and the second signal quality when the difference between the first signal quality and the second signal quality is within the specified signal quality range and when the rank of the wireless channel through which the specified wireless signal is received is "1".

In an embodiment, while transmitting and/or receiving a wireless signal by using a first beam pattern of the first antenna module, the instructions, when executed by the processor 120, may cause the processor 120 to receive the specified wireless signal by using a plurality of beam patterns 520 of the first antenna module 510 and a plurality of beam patterns 540 of the second antenna module 530, to identify a first signal quality for the specified wireless signal of the first beam pattern (e.g., the beam pattern 523) of the first antenna module 510, to identify a plurality of second signal qualities for the specified wireless signal of the plurality of beam patterns 521, 522, 524, and 525 other than the first beam pattern (e.g., the beam pattern 523), to determine an antenna module and a beam pattern, which are to transmit and/or receive a wireless signal, based on first channel information about each of the plurality of beam patterns 520 of the first antenna module 510 and second channel information about each of the plurality of beam patterns 540 of the second antenna module 530 when a difference between the first signal quality and at least one second signal quality of the plurality of second signal qualities is within the specified signal quality range and when the rank of the wireless channel through which the specified wireless signal is received is 2 or more, and to transmit and/or receive a wireless signal by using the determined antenna module and the determined beam pattern.

In an embodiment, a first part of the one or more antennas included in the first antenna module may be steered in a first direction, and a second part of the one or more antennas included in the first antenna module may be steered in a second direction distinguished from the first direction.

According to an embodiment of the present disclosure, an electronic device 101 may include a first antenna module 510 that includes one or more multi-polarized antennas, a second antenna module 530 that is spaced from the first antenna module and includes one or more multi-polarized antennas, a processor 120, and a memory 130 that stores instructions. While transmitting and/or receiving a wireless signal through the first antenna module, the instructions, when executed by the processor 120, may cause the processor 120 to receive a specified wireless signal through the first antenna module 510 and the second antenna module 530, to identify a first signal quality for the specified wireless signal of the first antenna module 510 and a second signal quality for the specified wireless signal of the second antenna module 530, to determine an antenna module, which is to transmit and/or receive a wireless signal, from among the first antenna module 510 and the second antenna module 530, based on a first channel coefficient associated with the first antenna module and a second channel coefficient associated with the second antenna module when a difference between the first signal quality and the second signal quality is within a specified signal quality range and when a rank of a wireless channel through which the specified wireless signal is received is 2 or more, and to transmit and/or receive a wireless signal by using the determined antenna module.

In an embodiment, the instructions, when executed by the processor 120, may cause the processor 120 to identify a first estimation speed (i.e., throughput) of the first antenna module 510 based on the first channel coefficient, to identify a second estimation speed (i.e., throughput) of the second antenna module 530 based on the second channel coefficient, and to determine the antenna module based on the first estimation speed and the second estimation speed.

According to an embodiment of the present disclosure, an operating method of an electronic device 101 may include, while transmitting and/or receiving a wireless signal through a first antenna module 510 of the electronic device 101, receiving a specified wireless signal through the first antenna module 510 and a second antenna module 530 of the electronic device, identifying a first signal quality for the specified wireless signal of the first antenna module 510 and a second signal quality for the specified wireless signal of the second antenna module 530, verifying whether a difference between the first signal quality and the second signal quality is within a specified signal quality range, determining an antenna module, which is to transmit and/or receive a wireless signal, from among the first antenna module 510 and the second antenna module 530, based on first channel information about the first antenna module and second channel information about the second antenna module, when the difference between the first signal quality and the second signal quality is within a specified signal quality range and when a rank of a wireless channel through which the specified wireless signal is received is 2 or more, and transmitting and/or receiving a wireless signal by using the determined antenna module.

In an embodiment, the determining of the antenna module may include determining the antenna module based on a first channel coefficient of the first channel information and a second channel coefficient of the second channel information.

In an embodiment, the determining of the antenna module may include identifying a first estimation speed (i.e., throughput) of the first antenna module 510 based on the first channel coefficient, identifying a second estimation speed (i.e., throughput) of the second antenna module 530 based on the second channel coefficient, and determining the antenna module based on the first estimation speed and the second estimation speed.

The operating method of the electronic device 101 according to an embodiment of the present disclosure may further include identifying a first channel correlation of the first antenna module 510 based on the first channel coefficient, identifying a second channel correlation of the second antenna module 530 based on the second channel coefficient, and determining the antenna module based on the first channel correlation and the second channel correlation.

The operating method of the electronic device 101 according to an embodiment of the present disclosure may further include identifying a first condition number of the first antenna module 510 based on the first channel coefficient, identifying a second condition number of the second antenna module 530 based on the second channel coefficient, and determining the antenna module based on the first condition number and the second condition number.

The operating method of the electronic device 101 according to an embodiment of the present disclosure may further include, while transmitting and/or receiving a wireless signal by using a first beam pattern (e.g., the beam pattern 523) of the first antenna module 510, receiving the specified wireless signal by using a plurality of beam patterns 520 of the first antenna module 510 and a plurality of beam patterns 540 of the second antenna module 530, identifying a first signal quality for the specified wireless signal of the first beam pattern (e.g., the beam pattern 523) of the first antenna module 510, identifying a plurality of second signal qualities for the specified wireless signal of the plurality of beam patterns 521, 522, 524, and 525 other than the first beam pattern (e.g., the beam pattern 523), determining an antenna module and a beam pattern, which are to transmit and/or receive a wireless signal, based on first channel information about each of the plurality of beam patterns 520 of the first antenna module 510 and second channel information about each of the plurality of beam patterns 540 of the second antenna module 530, when a difference between the first signal quality and at least one second signal quality of the plurality of second signal qualities is within the specified signal quality range and when the rank of the wireless channel through which the specified wireless signal is received is 2 or more, and transmitting and/or receiving a wireless signal by using the determined antenna module and the determined beam pattern.

The electronic device according to various embodiments may be one of various types of electronic devices. The electronic devices may include, for example, a portable communication device (e.g., a smartphone), a computer device, a portable multimedia device, a portable medical device, a camera, a wearable device, or a home appliance. According to an embodiment of the disclosure, the electronic devices are not limited to those described above.

It should be appreciated that various embodiments of the present disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B," "at least one of A and B," "at least one of A or B," "A, B, or C," "at least one of A, B, and C," and "at least one of A, B, or C," may include any one of, or all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), it means that the element may be coupled with the other element directly (e.g., wiredly), wirelessly, or via a third element.

As used in connection with various embodiments of the disclosure, the term "module" may include a unit implemented in hardware, software, or firmware, and may interchangeably be used with other terms, for example, "logic," "logic block," "part," or "circuitry". A module may be a single integral component, or a minimum unit or part thereof, adapted to perform one or more functions. For example, according to an embodiment, the module may be implemented in a form of an application-specific integrated circuit (ASIC).

Various embodiments as set forth herein may be implemented as software (e.g., the program 140) including one or more instructions that are stored in a storage medium (e.g., internal memory 136 or external memory 138) that is readable by a machine (e.g., the electronic device 101). For example, a processor (e.g., the processor 120) of the machine (e.g., the electronic device 101) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a complier or a code executable by an interpreter. The machine-readable storage medium may be provided in the form of a non-transitory storage medium. Wherein, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

According to an embodiment, a method according to various embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., PlayStore™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments, each component (e.g., a module or a program) of the above-described components may include a single entity or multiple entities, and some of the multiple entities may be separately disposed in different components. According to various embodiments, one or more of the above-described components may be omitted, or one or more other components may be added. Alternatively or additionally, a plurality of components (e.g., modules or programs) may be integrated into a single component. In such a case, according to various embodiments, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

What is claimed is:

1. An electronic device comprising:
a first antenna module including one or more antennas;
a second antenna module spaced from the first antenna module and including one or more antennas;
a processor; and
a memory configured to store instructions, wherein the instructions, when executed by the processor, cause the electronic device to:
while transmitting or receiving through the first antenna module,
receive a specified wireless signal through the first antenna module and the second antenna module;
identify a first signal quality for the specified wireless signal of the first antenna module and a second signal quality for the specified wireless signal of the second antenna module;
determine whether a difference between the first signal quality and the second signal quality is within a specified signal quality range;
determine whether a rank of a wireless channel through which the specified wireless signal is received is two or more; and
in response to determinations that the difference between the first signal quality and the second signal quality is within the specified signal quality range and that the rank of the wireless channel through which the specified wireless signal is received is two or more, select an antenna module, which is to transmit or receive a wireless signal, from among the first antenna module and the second antenna module, based on first channel information about the first antenna module and second channel information about the second antenna module; and
transmit or receive the wireless signal by using the selected antenna module.

2. The electronic device of claim 1, wherein the instructions, when executed by the processor, cause the electronic device to:
select the antenna module based on a first channel coefficient of the first channel information and a second channel coefficient of the second channel information.

3. The electronic device of claim 2, wherein the instructions, when executed by the processor, cause the electronic device to:
identify a first estimation speed of the first antenna module based on the first channel coefficient;
identify a second estimation speed of the second antenna module based on the second channel coefficient; and
select the antenna module based on the first estimation speed and the second estimation speed.

4. The electronic device of claim 2, wherein the instructions, when executed by the processor, cause the electronic device to:
identify a first channel correlation of the first antenna module based on the first channel coefficient;
identify a second channel correlation of the second antenna module based on the second channel coefficient; and
select the antenna module based on the first channel correlation and the second channel correlation.

5. The electronic device of claim 4, wherein the instructions, when executed by the processor, cause the electronic device to:
identify a first weighted channel correlation based on the first channel correlation and the first signal quality;
identify a second weighted channel correlation based on the second channel correlation and the second signal quality; and
select the antenna module based on the first weighted channel correlation and the second weighted channel correlation.

6. The electronic device of claim 5, wherein the instructions, when executed by the processor, cause the electronic device to:
multiply a first weight and a value obtained by subtracting the first channel correlation from a first reference value, thereby generating a multiplying result associated with the first weight;
identify the first weighted channel correlation by adding the first signal quality and the multiplying result associated with the first weight;
multiply a second weight and a value obtained by subtracting the second channel correlation from a second reference value, thereby generating a multiplying result associated with the second weight; and
identify the second weighted channel correlation by adding the second signal quality and the multiplying result associated with the second weight.

7. The electronic device of claim 2, wherein the instructions, when executed by the processor, cause the electronic device to:
identify a first condition number of the first antenna module based on the first channel coefficient;
identify a second condition number of the second antenna module based on the second channel coefficient; and
select the antenna module based on the first condition number and the second condition number.

8. The electronic device of claim 7, wherein the instructions, when executed by the processor, cause the electronic device to:
identify a first adjustment condition number based on the first condition number and the first signal quality;
identify a second adjustment condition number based on the second condition number and the second signal quality; and
determine the antenna module based on the first adjustment condition number and the second adjustment condition number.

9. The electronic device of claim 8, wherein the instructions, when executed by the processor, cause the electronic device to:
identify the first adjustment condition number by multiplying the first condition number and the first signal quality; and
identify the second adjustment condition number by multiplying the second condition number and the second signal quality.

10. The electronic device of claim 1, wherein the instructions, when executed by the processor, cause the electronic device to:
 in response to determinations that the difference between the first signal quality and the second signal quality is within the specified signal quality range and the rank of the wireless channel through which the specified wireless signal is received is not two or more, select the antenna module to transmit or receive the wireless signal, based on the first signal quality and the second signal quality.

11. The electronic device of claim 1, wherein the instructions, when executed by the processor, cause the electronic device to:
 while transmitting or receiving by using a first beam pattern of the first antenna module,
  receive the specified wireless signal by using a plurality of beam patterns of the first antenna module and a plurality of beam patterns of the second antenna module;
  identify a first signal quality for the specified wireless signal of the first beam pattern of the first antenna module;
  identify a plurality of second signal qualities for the specified wireless signal of the plurality of beam patterns other than the first beam pattern; and
  in response to determining that a difference between the first signal quality and at least one second signal quality of the plurality of second signal qualities is within the specified signal quality range and that the rank of the wireless channel through which the specified wireless signal is received is two or more, select the antenna module and a beam pattern, which are to transmit or receive a wireless signal, from among the pluralities of beam patterns of the first and second antenna modules, based on first channel information about each beam pattern from among the plurality of beam patterns of the first antenna module and second channel information about each beam pattern from among the plurality of beam patterns of the second antenna module; and
 transmit or receive the wireless signal by using the selected antenna module and the selected beam pattern.

12. The electronic device of claim 1, wherein a first part of the one or more antennas included in the first antenna module is steered in a first direction, and
 wherein a second part of the one or more antennas included in the first antenna module is steered in a second direction different from the first direction.

13. An electronic device comprising:
 a first antenna module including one or more multi-polarized antennas;
 a second antenna module spaced from the first antenna module and including one or more multi-polarized antennas;
 a processor; and
 a memory configured to store instructions, wherein the instructions, when executed by the processor, cause the electronic device to:
 while transmitting or receiving through the first antenna module,
  receive a specified wireless signal through the first antenna module and the second antenna module;
  identify a first signal quality for the specified wireless signal of the first antenna module and a second signal quality for the specified wireless signal of the second antenna module;
  determine whether a difference between the first signal quality and the second signal quality is within a specified signal quality range;
  determine whether a rank of a wireless channel through which the specified wireless signal is received is two or more; and
  in response to determinations that the difference between the first signal quality and the second signal quality is within the specified signal quality range and that the rank of the wireless channel through which the specified wireless signal is received is two or more, select an antenna module, which is to transmit or receive a wireless signal, from among the first antenna module and the second antenna module, based on a first channel coefficient associated with the first antenna module and a second channel coefficient associated with the second antenna module; and
 transmit or receive the wireless signal by using the selected antenna module.

14. The electronic device of claim 13, wherein the instructions, when executed by the processor, cause the electronic device to:
 identify a first estimation speed of the first antenna module based on the first channel coefficient;
 identify a second estimation speed of the second antenna module based on the second channel coefficient; and
 select the antenna module based on the first estimation speed and the second estimation speed.

15. An operating method of an electronic device, the method comprising:
 while transmitting or receiving through a first antenna module of the electronic device,
  receiving a specified wireless signal through the first antenna module and a second antenna module of the electronic device;
  identifying a first signal quality for the specified wireless signal of the first antenna module and a second signal quality for the specified wireless signal of the second antenna module;
  determining whether a difference between the first signal quality and the second signal quality is within a specified signal quality range;
  determining whether a rank of a wireless channel through which the specified wireless signal is received is two or more; and
  in response to determinations that the difference between the first signal quality and the second signal quality is within the specified signal quality range and that the rank of the wireless channel through which the specified wireless signal is received is two or more, selecting an antenna module, which is to transmit or receive a wireless signal, from among the first antenna module and the second antenna module, based on first channel information about the first antenna module and second channel information about the second antenna module; and
 transmitting or receiving the wireless signal by using the selected antenna module.

16. The method of claim 15, wherein the selecting of the antenna module includes:
 selecting the antenna module based on a first channel coefficient of the first channel information and a second channel coefficient of the second channel information.

17. The method of claim 16, wherein the selecting of the antenna module includes:
 identifying a first estimation speed of the first antenna module based on the first channel coefficient;

identifying a second estimation speed of the second antenna module based on the second channel coefficient; and selecting the antenna module based on the first estimation speed and the second estimation speed.

18. The method of claim 16, further comprising:

identifying a first channel correlation of the first antenna module based on the first channel coefficient;

identifying a second channel correlation of the second antenna module based on the second channel coefficient; and selecting the antenna module based on the first channel correlation and the second channel correlation.

19. The method of claim 16, further comprising:

identifying a first condition number of the first antenna module based on the first channel coefficient;

identifying a second condition number of the second antenna module based on the second channel coefficient; and selecting the antenna module based on the first condition number and the second condition number.

20. The method of claim 15, further comprising:

while transmitting or receiving by using a first beam pattern of the first antenna module,
receiving the specified wireless signal by using a plurality of beam patterns of the first antenna module and a plurality of beam patterns of the second antenna module;

identifying a first signal quality for the specified wireless signal of the first beam pattern of the first antenna module;

identifying a plurality of second signal qualities for the specified wireless signal of the plurality of beam patterns other than the first beam pattern; and in response to determining that a difference between the first signal quality and at least one second signal quality of the plurality of second signal qualities is within the specified signal quality range and that the rank of the wireless channel through which the specified wireless signal is received is two or more, selecting the antenna module and a beam pattern, which are to transmit or receive a wireless signal, from among the pluralities of beam patterns of the first and second antenna modules, based on first channel information about each beam pattern from among the plurality of beam patterns of the first antenna module and second channel information about each beam pattern from among the plurality of beam patterns of the second antenna module; and transmitting or receiving the wireless signal by using the selected antenna module and the selected beam pattern.

* * * * *